(12) United States Patent
Naruniec et al.

(10) Patent No.: US 11,222,466 B1
(45) Date of Patent: Jan. 11, 2022

(54) THREE-DIMENSIONAL GEOMETRY-BASED MODELS FOR CHANGING FACIAL IDENTITIES IN VIDEO FRAMES AND IMAGES

(71) Applicants: DISNEY ENTERPRISES, INC., Burbank, CA (US); ETH Zürich (Eidgenössische Technische Hochschule Zürich), Zürich (CH)

(72) Inventors: Jacek Krzysztof Naruniec, Windlach (CH); Derek Edward Bradley, Zurich (CH); Thomas Etterlin, Ottenbach (CH); Paulo Fabiano Urnau Gotardo, Zurich (CH); Leonhard Markus Helminger, Zurich (CH); Christopher Richard Schroers, Zurich (CH); Romann Matthew Weber, Uster (CH)

(73) Assignees: Disney Enterprises, Inc., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 0 days.

(21) Appl. No.: 17/039,895

(22) Filed: Sep. 30, 2020

(51) Int. Cl.
*G06T 17/00* (2006.01)
*G06T 17/10* (2006.01)
(Continued)

(52) U.S. Cl.
CPC .......... *G06T 17/10* (2013.01); *G06K 9/00281* (2013.01); *G06N 3/04* (2013.01); *G06T 19/20* (2013.01)

(58) Field of Classification Search
None
See application file for complete search history.

(56) References Cited

U.S. PATENT DOCUMENTS

| 10,552,667 B1 | 2/2020 | Bogan, III et al. |
| 10,552,977 B1 | 2/2020 | Theis et al. |

(Continued)

FOREIGN PATENT DOCUMENTS

| CN | 111160138 A | 5/2020 |
| GN | 111028318 A | 4/2020 |

(Continued)

OTHER PUBLICATIONS

Beeler et al., "Rigid Stabilization of Facial Expressions", ACM Transactions on Graphics, vol. 33, No. 4, Article 44, DOI: http://dx.doi.org/10.1145/2601097.2601182, Jul. 2014, pp. 44:1-44:9.

(Continued)

*Primary Examiner* — Martin Mushambo
(74) *Attorney, Agent, or Firm* — Artegis Law Group, LLP

(57) ABSTRACT

Techniques are disclosed for changing the identities of faces in video frames and images. In embodiments, three-dimensional (3D) geometry of a face is used to inform the facial identity change produced by an image-to-image translation model, such as a comb network model. In some embodiments, the model can take a two-dimensional (2D) texture map and/or a 3D displacement map associated with one facial identity as inputs and output another 2D texture map and/or 3D displacement map associated with a different facial identity. The other 2D texture map and/or 3D displacement map can then be used to render an image that includes the different facial identity.

20 Claims, 13 Drawing Sheets

(51) Int. Cl.
*G06K 9/00* (2006.01)
*G06T 19/20* (2011.01)
*G06N 3/04* (2006.01)

(56) References Cited

U.S. PATENT DOCUMENTS

| | | | | |
|---|---|---|---|---|
| 2014/0071308 | A1* | 3/2014 | Cieplinski | G06T 7/73 348/222.1 |
| 2018/0190377 | A1* | 7/2018 | Schneemann | G06K 9/00275 |
| 2018/0374251 | A1* | 12/2018 | Mitchell | G06T 13/40 |
| 2019/0213772 | A1* | 7/2019 | Lombardi | G06T 15/205 |
| 2019/0378242 | A1* | 12/2019 | Zhang | G06K 9/6201 |

FOREIGN PATENT DOCUMENTS

| | | |
|---|---|---|
| GN | 111080511 A | 4/2020 |
| WO | 2020/037679 A1 | 2/2020 |

OTHER PUBLICATIONS

Beeler et al., "High-Quality Single-Shot Capture of Facial Geometry", ACM Transactions on Graphics, vol. 29, No. 4, Article 40, http://doi.acm.org/10.1145/1778765.1778777, Jul. 2010, pp. 40:1-40:9.

Berard et al., "Lightweight Eye Capture Using a Parametric Model", ACM Transactions on Graphics, vol. 35, No. 4, Article 117, http://doi.acm.org/10.1145/2897824.2925962, Jul. 2016, pp. 117:1-117:12.

Bermano et al., "Detailed Spatio-Temporal Reconstruction of Eyelids", ACM Transactions on Graphics (TOG), vol. 34, No. 4, Article 44, DOI: http://dx.doi.org/10.1145/2766924, Aug. 2015, pp. 44:1-44:11.

Berard et al., "High-Quality Capture of Eyes", ACM Transactions on Graphics (TOG), vol. 33, No. 6, 2014, pp. 1-12.

Beeler et al., "High-Quality Passive Facial Performance Capture using Anchor Frames", In Acm SIGGRAPH, ACM Transactions on Graphics, vol. 30, No. 4, Article 75, http://doi.acm.Org/10.1145/1964921.1964970, Jul. 2011, pp. 75:1-75:10.

Bas et al., "3D Morphable Models as Spatial Transformer Networks", In Proceedings of the IEEE International Conference on Computer Vision Workshops, 2017, pp. 904-912.

Bojanowski et al., "Optimizing the Latent Space of Generative Networks", arXiv: 1707.05776, 2017, 10 pages.

Bitouk et al., "Face Swapping: Automatically Replacing Faces in Photographs", In ACM SIGGRAPH, ACM Transactions on Graphics, vol. 27, No. 3, Article 39, DOI 10.1145/1360612.1360638, Aug. 2008, pp. 39:1-39:8.

Blanz et al., "Exchanging Faces in Images", In Computer Graphics Forum, EUROGRAPHICS 2004, vol. 23, No. 3, 2004, pp. 669-676.

Blanz et al., "A Morphable Model For The Synthesis Of 3D Faces", In Proceedings of the 26th annual conference on Computer graphics and interactive techniques, 1999, pp. 187-194.

Cao et al., "FaceWarehouse: a 3D Facial Expression Database for Visual Computing", IEEE Transactions on Visualization and Computer Graphics, vol. 20, No. 3, 2013, pp. 413-425.

Feng et al., "Joint 3D Face Reconstruction and Dense Alignment with Position Map Regression Network", In Proceedings of the European Conference on Computer Vision (ECCV), 2018, pp. 534-551.

Ghosh et al., "Multiview Face Capture using Polarized Spherical Gradient Illumination", ACM Transactions on Graphics, vol. 30, No. 6, Article 129, http://doi.acm.org/10.1145/2024156.2024163, Dec. 2011, pp. 129:1-129:10.

Gu et al., "Geometry Images", In Proceedings of the 29th annual conference on Computer graphics and interactive techniques, 2002, pp. 355-361.

Goodfellow et al., "Generative Adversarial Nets", In Advances in neural information processing systems, 2014, pp. 2672-2680.

Gotardo et al., "Practical Dynamic Facial Appearance Modeling and Acquisition", ACM Trans. Graph., vol. 37, No. 6, Article 232, https://doi.org/10.1145/3272127.3275073, Nov. 2018, pp. 232:1-232:13.

Garrido et al., "Automatic Face Reenactment", In Proceedings of the IEEE Conference on Computer Vision and Pattern Recognition, DOI 10.1109/CVPR.2014 537, 2014, pp. 4217-4224.

Guo et al., "cleardusk / 3DDFA", https://github.com/cleardusk/3DDFA, 2018, 15 pages.

Henderson et al., "Learning Single-Image 3D Reconstruction by Generative Modelling of Shape, Pose and Shading", International Journal of Computer Vision, vol. 128, https://doi.org/10.1007/s11263-019-01219-8, 2019, pp. 835-854.

Isola et al., "Image-to-Image Translation with Conditional Adversarial Networks", In Proceedings of the IEEE conference on computer vision and pattern recognition, 2017, pp. 1125-1134.

Karras et al., "Progressive Growing of Gans For Improved Quality, Stability, And Variation", ICLR 2018, arXiv: 1710.10196, 2017, pp. 1-26.

Kingma et al., "Adam: A Method for Stochastic Optimization", ICLR 2015, arXiv: 1412.6980, 2014, pp. 1-15.

Kim et al., "Deep Video Portraits", ACM Transactions on Graphics (TOG), vol. 37, No. 4, Article 163, https://doi.org/10.1145/3197517.3201283, Aug. 2018, pp. 163:1-163:14.

Korshunova et al., "Fast Face-swap Using Convolutional Neural Networks", In Proceedings of the IEEE International Conference on Computer Vision, 2017, pp. 3677-3685.

Kato et al., "Neural 3D Mesh Renderer", In Proceedings of the IEEE Conference on Computer Vision and Pattern Recognition, 2018, pp. 3907-3916.

Li et al., "Differentiable Monte Carlo Ray Tracing through Edge Sampling", ACM Transactions on Graphics (TOG), vol. 37, No. 6, Article 222, https://doi.org/10.1145/3272127.3275109, Nov. 2018, pp. 222:1-222:11.

Loper et al., "OpenDR: An Approximate Differentiable Renderer", In European Conference on Computer Vision, 2014, pp. 154-169.

Liu et al., "Unsupervised Image-to-Image Translation Networks", In Advances in neural information processing systems, 2017, pp. 700-708.

Liu et al., "Soft Rasterizer: Differentiable Rendering for Unsupervised Single-View Mesh Reconstruction", arXiv:1901.05567, 2019, pp. 4321-4330.

Lee et al., "MaskGAN: Towards Diverse and Interactive Facial Image Manipulation", In IEEE Conference on Computer Vision and Pattern Recognition (CVPR), 2020, pp. 5549-5558.

Lombardi et al., "Deep Appearance Models for Face Rendering", ACM Transactions on Graphics (TOG), vol. 37, No. 4, Article 68, https://doi.org/10.1145/3197517.3201401, Aug. 2018, pp. 68:1-68:13.

Martin-Brualla et al., "LookinGood: Enhancing Performance Capture with Real-time Neural Re-Rendering", arXiv:1811.05029, https://doi.org/10.1145/3272127.3275099, ACM Trans. Graph., vol. 37, No. 6, Article 255, Nov. 2018, pp. 255:1-255:14.

Mirza et al., "Conditional Generative Adversarial Nets", arXiv:1411.1784, 2014 pp. 1-7.

Nimier-David et al., "Mitsuba 2: A Retargetable Forward and Inverse Renderer", ACM Transactions on Graphics (TOG), vol. 38, No. 6, Article 203, https://doi.org/101145/3355089.3356498, Nov. 2019, pp. 203:1-203:17.

Naruniec et al., "High-Resolution Neural Face Swapping for Visual Effects", In Eurographics Symposium on Rendering, vol. 39, No. 4, DOI: 10.1111/cgf.14062, 2020, pp. 173-184.

Nirkin et al., "FSGAN: Subject Agnostic Face Swapping and Reenactment", In Proceedings of the IEEE International Conference on Computer Vision, 2019, pp. 7184-7193.

Nirkin et al., "On Face Segmentation, Face Swapping, and Face Perception", In 2018 13th IEEE International Conference on Automatic Face & Gesture Recognition (FG 2018), arXiv:1704.06729v, 2018, pp. 98-105.

Nagano et al., "paGAN: Real-time Avatars Using Dynamic Textures", ACM Transactions on Graphics (TOG), vol. 37, No. 6, Article 258, https://doi.org/10.1145/3272127.3275075, Nov. 2018, pp. 258:1-258:12.

(56) References Cited

OTHER PUBLICATIONS

Olszewski et al., "Realistic Dynamic Facial Textures from a Single Image using GANs", In Proceedings of the IEEE International Conference on Computer Vision, 2017, pp. 5429-5438.
Petersen et al., "Pix2Vex: Image-to-Geometry Reconstruction using a Smooth Differentiable Renderer", arXiv: 1903.11149, 2019, pp. 1-13.
Oaysan et al., "A 3D Face Model for Pose and Illumination Invariant Face Recognition", In 2009 Sixth IEEE International Conference on Advanced Video and Signal Based Surveillance, 2009, pp. 296-301.
Ranjan et al., "Generating 3D faces using Convolutional Mesh Autoencoders", In Proceedings of the European Conference on Computer Vision (ECCV), 2018, pp. 704-720.
Ronneberger et al., "U-Net: Convolutional Networks for Biomedical Image Segmentation", In International Conference on Medical image computing and computer-assisted intervention, DOI: 10.1007/978-3-319-24574-4_28, 2015, pp. 234-241.
Rhodin et al., "A Versatile Scene Model with Differentiable Visibility Applied to Generative Pose Estimation", In Proceedings of the IEEE International Conference on Computer Vision, 2015, pp. 765-773.
Savitzky et al., "Smoothing and Differentiation of Data by Simplified Least Squares Procedures", Analytical chemistry, vol. 36, No. 8, 1964, pp. 1627-1639.
Thies et al., "Neural Voice Puppetry:Audio-driven Facial Reenactment", arXiv: 1912.05566, 2019, pp. 1-23.
Tewari et al., "State of the Art on Neural Rendering", EUROGRAPHICS 2020, arXiv:2004.03805, DOI: 10.1111/cgf.14022, vol. 39, No. 2, 2020, pp. 701-727.
Thies et al., "Real-time Expression Transfer for Facial Reenactment", ACM Trans. Graph., vol. 34, No. 6, 2015, 14 pages.
Thies et al., "Deferred Neural Rendering: Image Synthesis using Neural Textures", ACM Transactions on Graphics (TOG), vol. 38, No. 4, Article 66, https://doi.org/10.1145/3306346.3323035, Jul. 2019, pp. 66:1-66:12.
Thies et al., "Face2Face: Real-time Face Capture and Reenactment of RGB Videos", In Proceedings of the IEEE conference on computer vision and pattern recognition, 2016, pp. 2387-2395.
Velinov et al., "Appearance Capture and Modeling of Human Teeth", ACM Transactions on Graphics (TOG), vol. 37, No. 6, Article 207, https://doi.org/10.1145/3272127.3275098, Nov. 2018, pp. 207:1-207:13.
Wu et al., "An Anatomically-Constrained Local Deformation Model for Monocular Face Capture", ACM Transactions on Graphics (TOG), vol. 35, No. 4, Article 115, DOI = 10.1145/2897824.2925882, Jul. 2016, pp. 115:1-115:12.
Wang et al., "Image Quality Assessment: From Error Visibility to Structural Similarity", IEEE Transactions on Image Processing, vol. 13, No. 4, Apr. 2004, pp. 600-612.
Wang et al., "Multi-Scale Structural Similarity for Image Quality Assessment", In The Thirty-Seventh Asilomar Conference on Signals, Systems & Computers, vol. 2, 2003, pp. 1398-1402.
Yu et al., "BiSeNet: Bilateral Segmentation Network for Real-time Semantic Segmentation", In Proceedings of the European conference on computer vision (ECCV), 2018, pp. 325-341.
Zhu et al., "Face Alignment in Full Pose Range: A 3D Total Solution", IEEE transactions on pattern analysis and machine intelligence, vol. 41, No. 1, arXiv:1804.01005v, 2017, pp. 78-92.
Zhu et al., "Unpaired Image-to-lmage Translation using Cycle-Consistent Adversarial Networks", In Computer Vision (ICCV), 2017 IEEE International Conference, 2017, pp. 2223-2232.
Zollhofer et al., "State of the Art on Monocular 3D Face Reconstruction, Tracking, and Applications", In Computer Graphics Forum, vol. 37, No. 2, DOI: 10.1111/cgf.13382, 2018, pp. 523-550.
Ding et al., "Swapped face detection using deep learning and subjective assessment", EURASIP Journal on Information Security, No. 6, https://link.springer.com/content/pdf/10.1186/s13635-020-00109-8.pdf, May 19, 2020, pp. 1-12.
Saito et al., "Photorealistic Facial Texture Inference Using Deep Neural Networks", https://arxiv.org/pdf/1612.00523.pdf, Dec. 2, 2016, pp. 1-14.
Petrov et al., "DeepFaceLab: Integrated, flexible and extensible face-swapping framework", https://arxiv.org/pdf/2005.05535.pdf, May 20, 2020, pp. 1-10.

\* cited by examiner

THREE-DIMENSIONAL GEOMETRY-BASED MODELS FOR CHANGING FACIAL IDENTITIES IN VIDEO FRAMES AND IMAGES

BACKGROUND

Technical Field

Embodiments of the present disclosure relate generally to computer science and computer graphics and, more specifically, to three-dimensional geometry-based models for changing facial identities in video frames and images.

Description of the Related Art

Oftentimes, the facial identity of an individual needs to be changed in the frames of a video or in a standalone image while maintaining the way the individual is performing within the video or image. As used herein, a "facial identity" refers to aspects of a facial appearance that are considered distinct from other aspects of a facial appearance that arise from differences in personal identities, ages, lighting conditions, and the like. Thus, two different facial identities may be attributed to different individuals or to the same individual under different conditions, such as the same individual at different ages or under different lighting conditions. As used herein, the "performance" of an individual, which also is referred to as the dynamic "behavior" of an individual, includes the facial expressions and poses with which the individual appears in the frames of a video or in a standalone image.

One example scenario that requires the facial identity of an individual to be changed while maintaining the way the individual is performing is when the individual needs to be portrayed at a younger age in a particular scene within a film. As another example, an individual may be unavailable for a given film production, and the face of that individual may need to be inserted into a particular scene within the film to replace the face of another individual who was available for the film production and performed in the particular scene.

Currently, there are few techniques for changing (i.e., replacing or modifying) facial identities in video frames and images that can produce photorealistic results. Some existing techniques utilize neural network models or three-dimensional (3D) morphable models to change facial identities in video frames and images. However, existing neural network techniques do not account for the 3D geometry of faces. As a result, such techniques oftentimes produce unrealistic-looking facial changes in video frames and images where the faces being modified in order to implement the requisite facial identity changes are shown with profile views or other extreme poses. Existing 3D morphable model techniques oftentimes rely on imperfect 3D geometry, without being able to correct for such imperfections, which can produce unwanted artifacts that look unrealistic after facial identities are changed in video frames and images.

As the foregoing illustrates, what is needed in the art are more effective techniques for changing facial identifies in video frames and images.

SUMMARY

One embodiment of the present disclosure sets forth a computer-implemented method for changing an object within a video frame or image. The method includes generating at least one of a first texture map or a first displacement map associated with a first image that includes a first object. The method further includes generating, via a machine learning model, at least one of a second texture map or a second displacement map based on the at least one of the first texture map or the first displacement map. In addition, the method includes rendering a second image based on the at least one of the second texture map or the second displacement map and three-dimensional (3D) geometry associated with the first object or a second object.

Other embodiments of the present disclosure include, without limitation, a computer-readable medium including instructions for performing one or more aspects of the disclosed techniques as well as a computing device for performing one or more aspects of the disclosed techniques.

At least one technical advantage of the disclosed techniques relative to the prior art is that the disclosed techniques can be effectively utilized to change (i.e., replace or modify) facial identities in video frames and images where the faces being modified to implement the requisite facial identity changes are shown with relatively extreme poses. The disclosed techniques also enable realistic-looking facial changes to be made in video frames and images, while reducing or eliminating the unwanted artifacts typically produced by 3D morphable models. In addition, the disclosed technique can produce more coherent and temporally-stable sequences of video frames than conventional techniques for changing facial identities. These technical advantages represent one or more technological improvements over prior art approaches.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
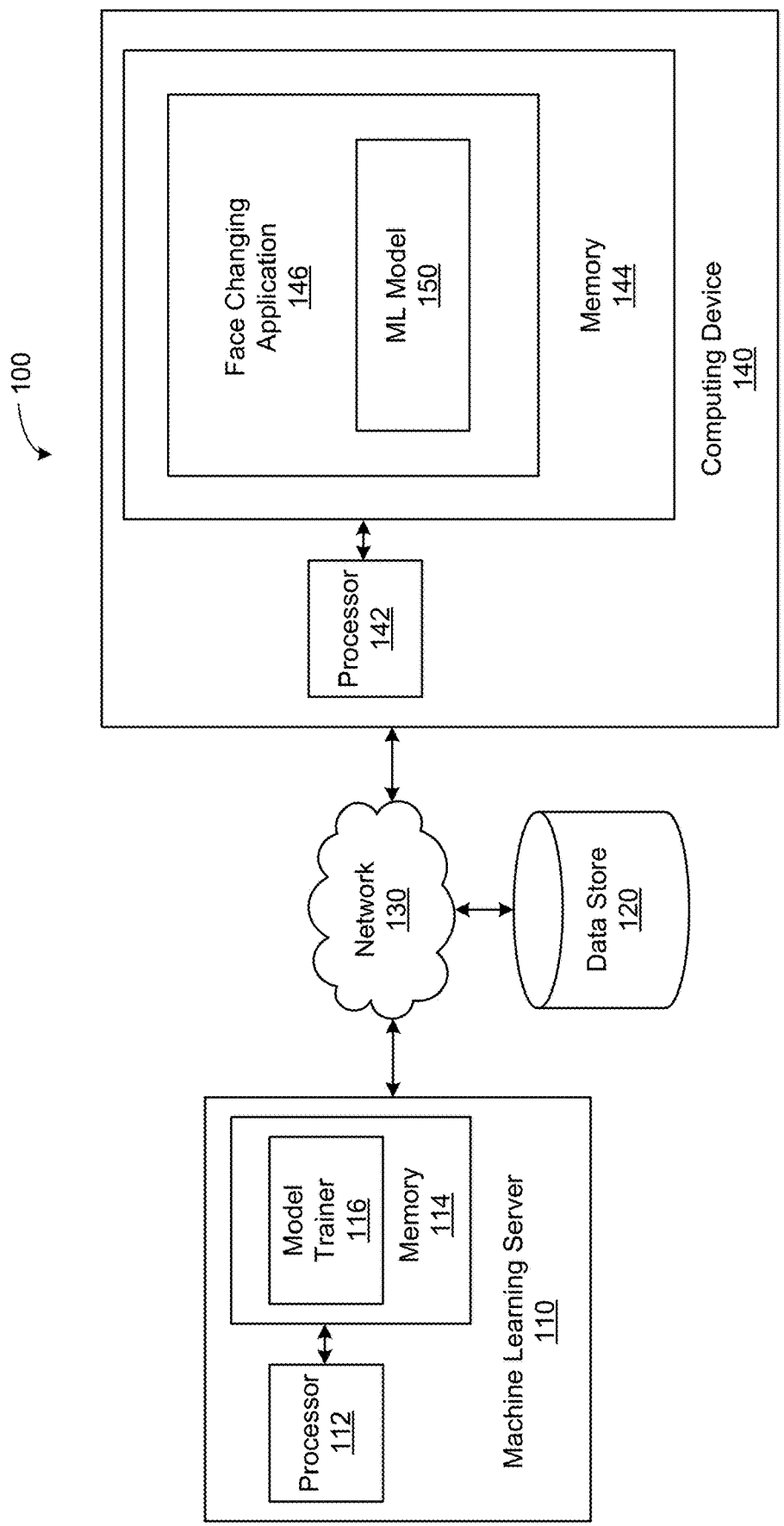
FIG. 1 illustrates a system configured to implement one or more aspects of the various embodiments.

FIG. 1 illustrates a system 100 configured to implement one or more aspects of the various embodiments. As shown, the system 100 includes a machine learning server 110, a data store 120, and a computing device 140 in communication over a network 130, which may be a wide area network (WAN) such as the Internet, a local area network (LAN), or any other suitable network.

As shown, a model trainer 116 executes on a processor 112 of the machine learning server 110 and is stored in a system memory 114 of the machine learning server 110. The processor 112 receives user input from input devices, such as a keyboard or a mouse. In operation, the processor 112 is the master processor of the machine learning server 110, controlling and coordinating operations of other system components. In particular, the processor 112 may issue commands that control the operation of a graphics processing unit (GPU) that incorporates circuitry optimized for graphics and video processing, including, for example, video output circuitry. The GPU may deliver pixels to a display device that may be any conventional cathode ray tube, liquid crystal display, light-emitting diode display, or the like.

The system memory 114 of the machine learning server 110 stores content, such as software applications and data, for use by the processor 112 and the GPU. The system memory 114 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the system memory 114. The storage may include any number and type of external memories that are accessible to the processor 112 and/or the GPU. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the machine learning server 110 shown herein is illustrative and that variations and modifications are possible. For example, the number of processors 112, the number of GPUs, the number of system memories 114, and the number of applications included in the system memory 114 may be modified as desired. Further, the connection topology between the various units in FIG. 1 may be modified as desired. In some embodiments, any combination of the processor 112, the system memory 114, and a GPU may be replaced with any type of virtual computing system, distributed computing system, or cloud computing environment, such as a public, private, or a hybrid cloud.

The model trainer 116 is configured to train machine learning models, including a machine learning (ML) model 150 that can be used to change the identities of faces in video frames and images. Example architectures of the ML model 150, as well as techniques for training the same, are discussed in greater detail below in conjunction with FIGS. 2-9. In some embodiments, the ML model 150 can take a two-dimensional (2D) texture associated with a facial identity as input and output another 2D texture associated with another facial identity, which can then be used along with three-dimensional (3D) facial geometry to render an image in which the other 2D texture is applied to the 3D facial geometry. In addition, an optional neural renderer (not shown) can be used to improve the results by generating rendered images that are similar to the images of faces in a training data set. In other embodiments, the ML model 150 can take as input a displacement map, which is generated based on 3D facial geometry associated with a video frame or image, a corresponding neutral facial geometry, a rigid motion transformation, and camera parameters. In such cases, the ML model 150 can output another displacement map associated with a different facial identity, which can then be applied to deform a neutral facial geometry corresponding to the different facial identity and used, along with the rigid motion transformation and the camera parameters (or a different rigid motion transformation and camera parameters), to render an image that includes facial geometry associated with the different facial identity. In further embodiments, the ML model 150 can take as inputs a texture map and a displacement map, which are generated based on an input frame, associated 3D facial geometry, corresponding neutral facial geometry, a rigid motion transformation, and camera parameters. In such cases, the ML model 150 can output another texture map and another displacement map associated with a different facial identity, which can then be used along with neutral facial geometry corresponding to the different facial identity, the rigid motion transformation, and the camera parameters (or a different rigid motion transformation and camera parameters), to render an image that includes facial geometry and texture associated with the different facial identity.

Training data and/or trained machine learning models, including the ML model 150, may be stored in the data store 120 and deployed in any suitable application(s), such as a face changing application 146. In some embodiments, the training data includes videos or images in which multiple facial identities appear under similar environmental and lighting conditions. For example, the environmental conditions may include the same setup, with the same background behind individuals who are recorded in the videos. In some embodiments, the ML model 150 can be trained using progressive training techniques, described in greater detail below in conjunction with FIGS. 2, 4, 6, and 8. In addition, in some embodiments, the ML model 150 can be trained together with an optional neural renderer model. In some embodiments, the data store 120 may include any storage device or devices, such as fixed disc drive(s), flash drive(s), optical storage, network attached storage (NAS), and/or a storage area-network (SAN). Although shown as accessible over the network 130, in some embodiments the machine learning server 110 may include the data store 120.

Illustratively, the face changing application 146 is stored in a memory 144, and executes on a processor 142, of the computing device 140. Components of the computing device 140, including the memory 144 and the processor 142, may be similar to corresponding components of the machine learning server 110. As shown, the face changing application 146 includes the ML model 150. More generally, the ML model 150 may be deployed to any suitable applications. For example, the face changing application 146 could be a face-swapping application that changes the facial identities appearing in the frames of a video or in standalone images using the ML model 150. Although described herein primarily with respect to face swapping as a reference example, techniques disclosed herein can generally be used in any technically feasible application, including facial retargeting, in which the facial performance in video frames or an image is modified, and facial reenactment (also sometimes referred to as "puppeteering"), in which a captured facial performance of one individual drives a facial performance of another individual in video frames or an image.

The number of machine learning servers and application servers may be modified as desired. Further, the functionality included in any of the applications may be divided across any number of applications or other software that are stored and execute via any number of devices that are located in any number of physical locations.

Figure 2:
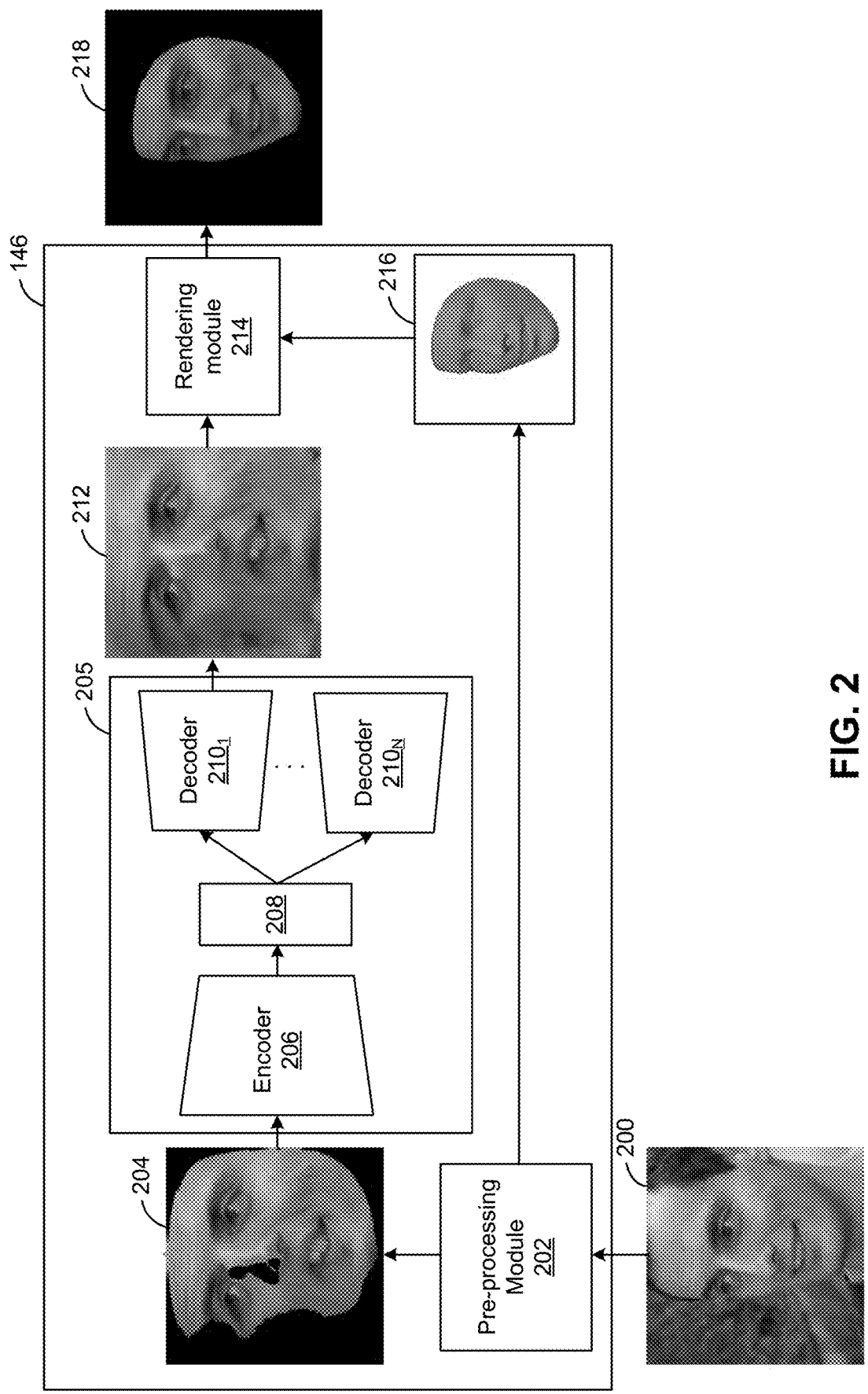
FIG. 2 is a more detailed illustration of the face changing application of FIG. 1, according to various embodiments.

Changing Facial Identities in Video Frames and Images Using Three-Dimensional Geometry Based Models FIG. 2 is a more detailed illustration of the face changing application 146 of FIG. 1, according to various embodiments. As shown, the face changing application 146 includes a pre-processing module 202 that processes a normalized input image 200 to generate a 2D texture 204 (also referred to herein as a "texture map") and a 3D face model 216. The input image 200 may be a video frame or a standalone image. For example, the input image 200 could be a high-definition (HD) resolution image, such as a one megapixel image, including a face that has been normalized. As used herein, normalization refers to an alignment procedure that fits landmarks on a face appearing in an image to match landmarks of a generic face with a neutral expression. As a result, facial features such as the eyes, nose, etc. are at similar locations within the normalized images. In embodiments, an image can be normalized in any technically-feasible manner, including using face alignment techniques to compute an affine transformation that rotates, scales, translates, etc. the image, and/or cropping the image. An affine transformation is a linear mapping that preserves points, straight lines, and planes. For example, in some embodiments, normalizing an image includes detecting a largest face in the image and determining the locations of facial landmarks using a modified deep alignment network (DAN). In such cases, the image can be rotated and scaled so that the eyes of the largest face lie on a predefined horizontal line and have a predefined ocular distance. The image can then be cropped and resized to, e.g., 1024×1024 pixels.

The pre-processing module 202 can generate the 2D texture 204 and the 3D face model 216 in any technically feasible manner, including using well-known techniques. For example, in some embodiments, the 3D face model 216 may be obtained by using a convolutional neural network and hand-crafted features to fit a 3D face model to the input image 200, and the 2D texture 204 may be obtained by unwrapping a texture map from the input image 200 using the 3D face model 216.

The 2D texture 204 that is output by the pre-processing module 202 is input into a comb network model 205 (also referred to herein as a "comb network"), which corresponds to the ML model 150 described above in conjunction with FIG. 1. Although described herein primarily with respect to comb networks, embodiments may use any technically-feasible models, such as other types of image-to-image translation networks. As shown, the comb network model 205 is an image-to-image translation neural network that generates a swapped 2D texture 204. Illustratively, the comb network model 205 includes an encoder 206 that encodes the 2D texture 204 into an encoded representation 208 of the input image 200, which is also referred to herein as a "latent representation" of the input image 200. The latent representation is a most compressed version of the normalized image generated by an encoder of the comb network model 205, which learns to be able to generate such a latent representation during training. Operation(s) performed by the encoder 206 to encode an image into a latent representation are also referred to herein as "encoding operation(s)."

As shown, the comb network model 205 also includes a number of decoders $210_{1-N}$ (individually referred to herein as "a decoder 210" and collectively referred to as "decoders 210"), each of which can be used to convert the latent space representation 208 of the 2D texture 204 into a swapped 2D texture 212 associated with a different identity. Operation(s) performed to generate an output image from a latent representation using a decoder 210 are also referred to herein as "decoding operation(s)." Although the output of decoders corresponding to the same facial identity as the input image are shown for illustratively purposes in FIGS. 2, 4, 6, and 8, it should be understood that other decoders can correspond to, and generate output (e.g., 2D textures) associated with, other facial identities.

In some embodiments, the comb network model 205 can include any number of decoders 210. In particular, training data that includes images or videos for a number of different identities can be used to train different decoders 210 of the comb network model 205. By contrast, the same encoder 206 can be trained for all of the different identities, and the encoder 206 may even generalize to other identities that are not included in the training data. In some embodiments, the comb network model 205 is trained on source and target pairs of images or video frames via progressive training. In such cases, the progressive training can include multiple "levels," during each of which a new level of the decoders 210 and a new level of the encoder 206 is added. The "shock" of adding new, untrained network components, can be attenuated by a gain parameter that acts as a fader switch to gradually blend activations of the new network components with those of the trained, smaller network. During each iteration of progressive training, the model trainer 116 can shuffle the facial identities, select a batch of images for each facial identity, perform a gradient update, and then proceed to the next facial identity.

More formally, given P facial identities, the comb network model 205 can have a common encoder E as well as any number of identity-specific decoders $D_p$, where $p \in \{1, \ldots, P\}$. Let $x_p \in X_p \subset X$ be a normalized image belonging to identity p. Facial model parameters $p_p$ can be obtained, which can be used along with the normalized image $x_p$ to obtain a texture $y_p$ and a texture mask $m_{y_p}$. The comb network model 205 can be progressively trained, using training data associated with different facial identities, and by minimizing a loss function of level l:

$$\mathcal{L}_l = \sum_{p=1}^{P} \frac{1}{|Y_p|} \sum_{y_p \in Y_p} f_l(y_p \odot m_{y_p}, \tilde{y}_p \odot m_{y_p}), \quad (1)$$

where $Y_p$ is a set of texture maps corresponding to facial identity p and $\tilde{y}_p = D_p(E(y_p))$ $y_p$ is the autoencoder formulation.

Subsequent to training, the goal of face swapping is to exchange facial identity s, which is the appearance source, with facial identity t, in a behavior and background target. In particular, a normalized input image $x_t$ can be used to obtain the texture $y_t$ and face model parameters $p_t = [f_t, R, t_{2d,t}, \alpha_{id,t}, \alpha_{exp,t}]^T$, where $f_t$ is the scale, R is the rotation matrix, $t_{2d,t}$ is the translation vector, $\alpha_{id,t}$ are the shape/identity parameters, and $\alpha_{exp,t}$ are the expression parameters. The face changing application 146 inputs the texture $y_t$ into the comb network model 205, and the s-th decoder of the comb network model 205, corresponding to the appearance source, is used to obtain a swapped texture $\tilde{y}_s = D_s(E(y_t))$. In some embodiments, geometry swapping can also be performed by swapping the shape/identity parameters $\alpha_{id,t}$.

Illustratively, a rendering module 214 processes the swapped 2D texture 204 and the 3D face model 216 to generate a rendered image 218 in which the swapped 2D texture 204 is applied to the 3D face model 216. In some embodiments, the rendering module 214 performs well-known rendering technique(s) that combine the swapped 2D texture 204 and geometry of the 3D face model 216 to generate the rendered image 218.

In the case of a video, the 3D model fitting process may not be consistent across frames, resulting in shape/identity parameters $\alpha_{id,t}$ that vary across frames even when fitting to the same facial identity. To account for such variations, in some embodiments, the shape/identity parameters of the source can be obtained by averaging $$\overline{\alpha}_{id,s} = \frac{1}{|A_{id,s}|} \sum_{\alpha_{id,s} \in A_{id,s}} \alpha_{id,s}, \quad (2)$$

where $A_{id,s}$ is the set of all identity parameters of $X_s$. In such cases, face model parameters $\tilde{p}_s = [f_t, R, t_{2d,t}, \overline{\alpha}_{id,s}, \alpha_{exp,t}]^T$ and texture $\tilde{y}_s$ can be input into a renderer/rasterizer to render an image with a swapped face in screen space. The initial image normalization can then be reversed, and contrast-preserving and multi-band compositing applied, to obtain an output image (corresponding to the rendered image 218).

Figure 3:
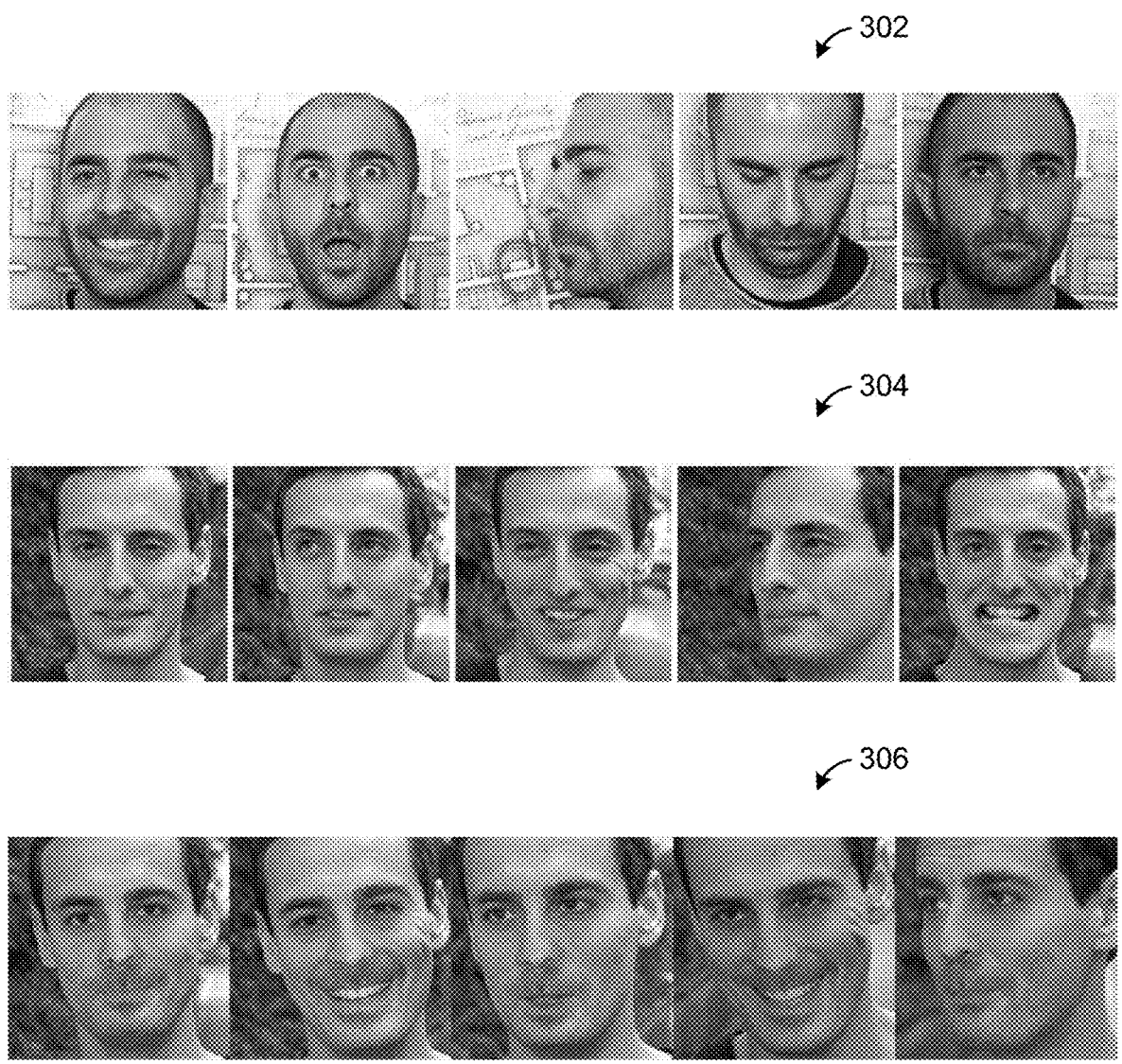
FIG. 3 illustrates an exemplar face swap in which a facial texture is changed, according to various embodiments.

FIG. 3 illustrates an exemplar face swap in which a facial texture is changed, according to various embodiments. As shown, images 302 including a facial identity that serves as an appearance source and can be used to train a corresponding decoder 210 in the comb network 205. Thereafter, images 304, which include another facial identity and provide behavior and background targets, can be input into the comb network 205. Using the decoder 210 corresponding to the facial identity of the appearance source, the face changing application 146 can generate facial textures that are combined during rendering with 3D facial geometry associated with the target facial identity to render images 306.

Figure 4:
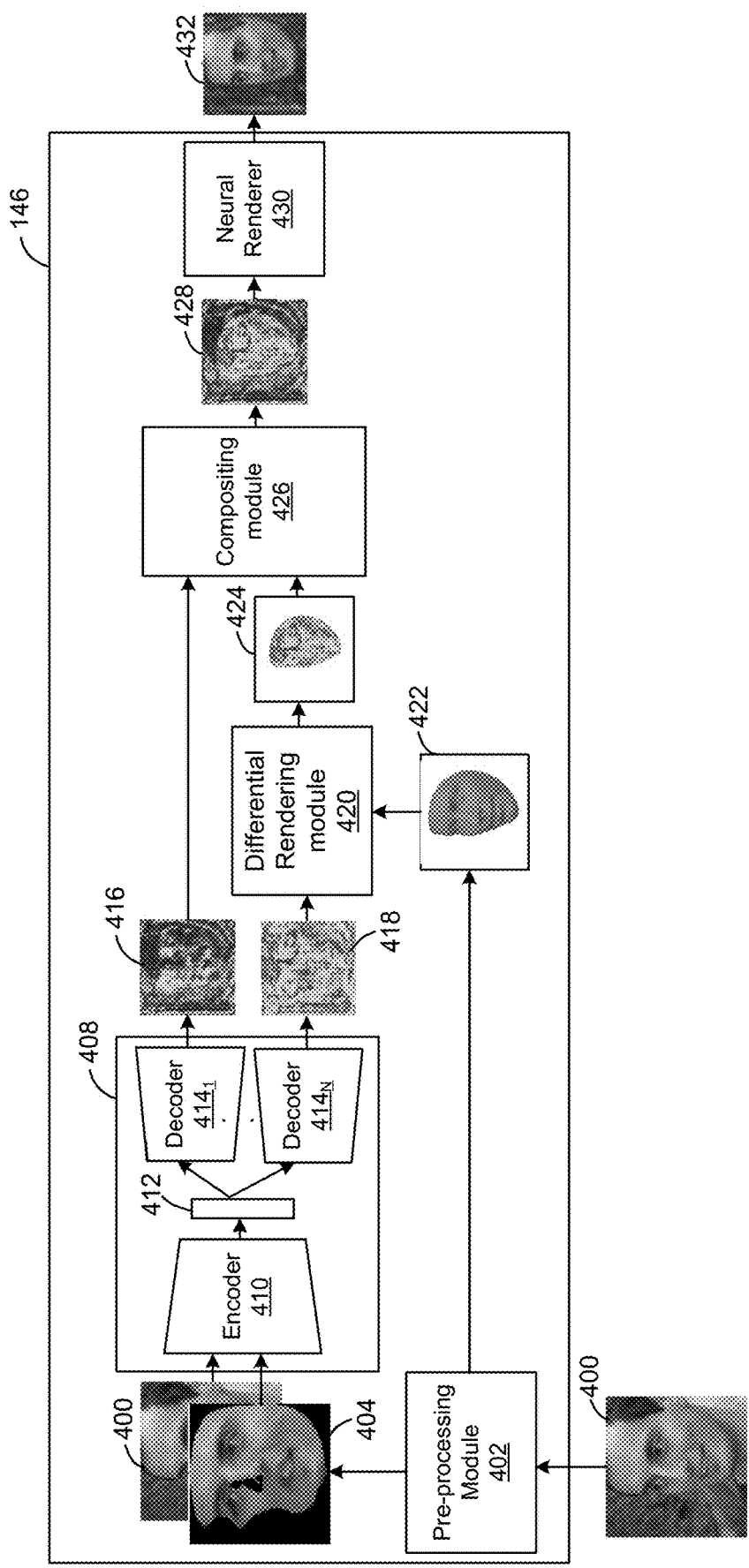
FIG. 4 is a more detailed illustration of the face changing application of FIG. 1, according to other various embodiments.

FIG. 4 is a more detailed illustration of the face changing application 146 of FIG. 1, according to other various embodiments. Similar to the discussion in conjunction with FIG. 2, the face changing application 146 includes a pre-processing module 402 that processes a normalized input image 400 to generate a 2D texture 404 and a 3D face model 422. The input image 400 may be a video frame or a standalone image and is similar to the input image 200, described above in conjunction with FIG. 2. The face changing application 146 inputs the input image 400 and the 2D texture 404 into a comb network 408 (corresponding to the ML model 150 described above in conjunction with FIG. 1), which includes an encoder 410 that generates a latent representation 412 and multiple decoders $414_{1-N}$ (individually referred to herein as "a decoder 414" and collectively referred to as "decoders 414"), to obtain images representing a neural texture 418 (also referred to herein as "neural texture map(s)") and a neural exterior face region 416. For example, the normalized input image 400 and the 2D texture 404 could be concatenated and input into the comb network 408. In some embodiments, the neural texture 418 and the neural exterior face region 416 can include any number of channels (e.g., 6 channels) that encode the appearance of the input face in a normalized texture space. For example, some of the channels of the neural texture 418 could represent the color of skin. More generally, features encoded by the channels can be learned during training of the comb network 408 along with a neural renderer 430, described in greater detail below.

As shown, a differential rendering module 420 renders an image 424 by combining the neural texture 418 image(s) and the 3D face model 422 generated during pre-processing. In some embodiments, the differential rendering module 420 renders the image 424 using well-known rendering techniques. A compositing module 426 then combines the rendered image 424, corresponding to the face, with the neural exterior face region 416, corresponding to background regions outside of the face. In some embodiments, the compositing module 426 may combine the rendered image 424 and the neural exterior face region 416 using masks for facial and non-facial regions that are computed by the pre-processing module 402.

Subsequent to combining the rendered image 424 and the neural exterior face region 416 into a composited image 428, the neural renderer 430 renders an output image 432 based on the composited image 428. Any technically-feasible neural renderer architecture, such as the LookinGood network architecture without the optional super-resolution layer, can be used in some embodiments. Advantageously, the neural renderer 430 can be trained to translate the composited image 428, which is an intermediate result, into a rendered image that appears more similar to training data, and is oftentimes more realistic than images rendered using other well-known rendering techniques, such as the rendering technique described above in conjunction with FIG. 2. Experience has shown that the neural renderer 430 can correct some artifacts caused by inaccuracies in the 3D face model 422. Although a single neural renderer 430 is shown for illustratively purposes, in some embodiments, distinct neural renderers can be trained and used for different facial identities.

In some embodiments, the neural renderer 430 may be trained along with the comb network 408 using, e.g., progressive training. In such cases, a sigmoid activation function can be used to transform multi-channel output of each resolution to four output channels of the "to-RGB" layers in the comb network 408. Further, the training can attempt to minimize a reconstruction loss that represents a difference between an input image (e.g., the image 400) and an output of the neural renderer 430 (e.g., the image 428). More formally, the following mean square error can be used:

$$\mathcal{L}_l = \sum_{p=1}^{P} \frac{1}{|X_p|} \sum_{x_p \in X_p} \lambda_1 f_l(x_p \odot m_{x_p}, \hat{x}_p \odot m_{x_p}) + \lambda_2 \|m_{x_p} - \hat{m}_{\hat{x}_p}\|_2, \quad (3)$$

where $\hat{x}_p$ is the output from a facial identity-specific neural renderer, $m_{x_p}$ is a face mask that is computed for an input image using a face segmentation algorithm (e.g., the BiSeNet neural network), and $\lambda_1$ and $\lambda_2$ are loss weighting factors. Further, the neural renderer 430 can predict the mask $\hat{m}_{\hat{x}_p}$ as the output of one of a number (e.g. six) channels.

Figure 5:
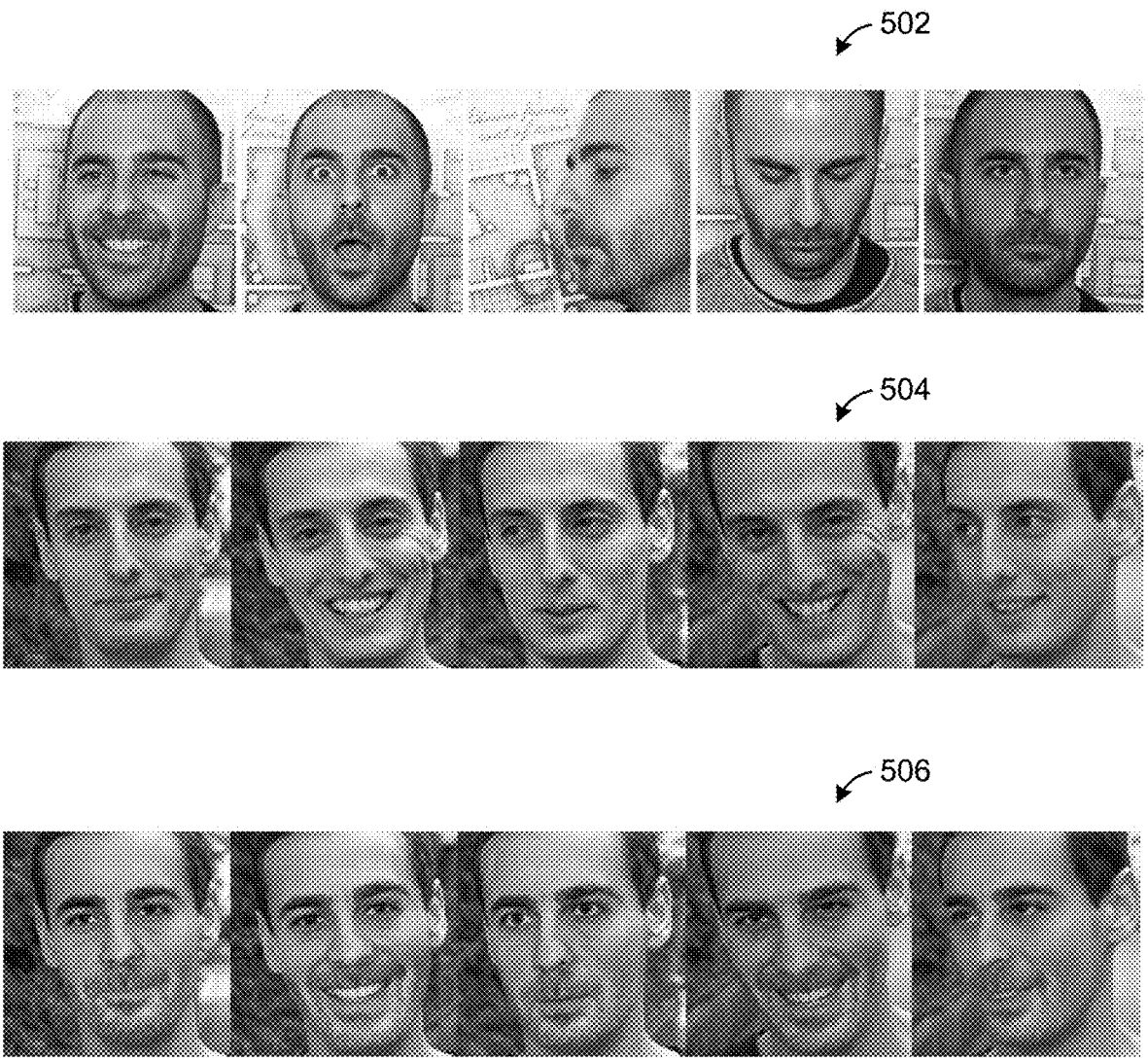
FIG. 5 illustrates an exemplar face swap in which neural rendering is applied, according to various embodiments.

FIG. 5 illustrates an exemplar face swap in which neural rendering is applied, according to various embodiments. Similar to the face swap described above in conjunction with FIG. 3, images 502 including a facial identity serve as an appearance source and can be used to train a corresponding one of the decoders 414 in the comb network 408. Thereafter, images 504, which include another facial identity and provide behavior and background targets, can be input into the comb network 408. Using the decoder 414 corresponding to the facial identity of the appearance source, the face changing application 146 can generate neural texture 418 image(s) and a neural exterior face region 416, the neural texture 418 image(s) can be used along with 3D facial geometry to render the image 424, and the rendered image 424 can be composited with the neural exterior face region 416 to generate the composited image 428, after which the composited image can be input into the neural renderer 430 to generate the rendered images 506. As described, the neural renderer 430 can be trained to generate rendered images that appear more similar to training data, and are oftentimes more realistic than images rendered using some other rendering techniques. In particular, experience has shown that the neural renderer 430 can generate images with fewer artifacts, such as gaps, unnatural eyes, etc. In addition, the neural renderer 430 can also be used to swap larger portions of faces than simple texture swapping.

Figure 6:
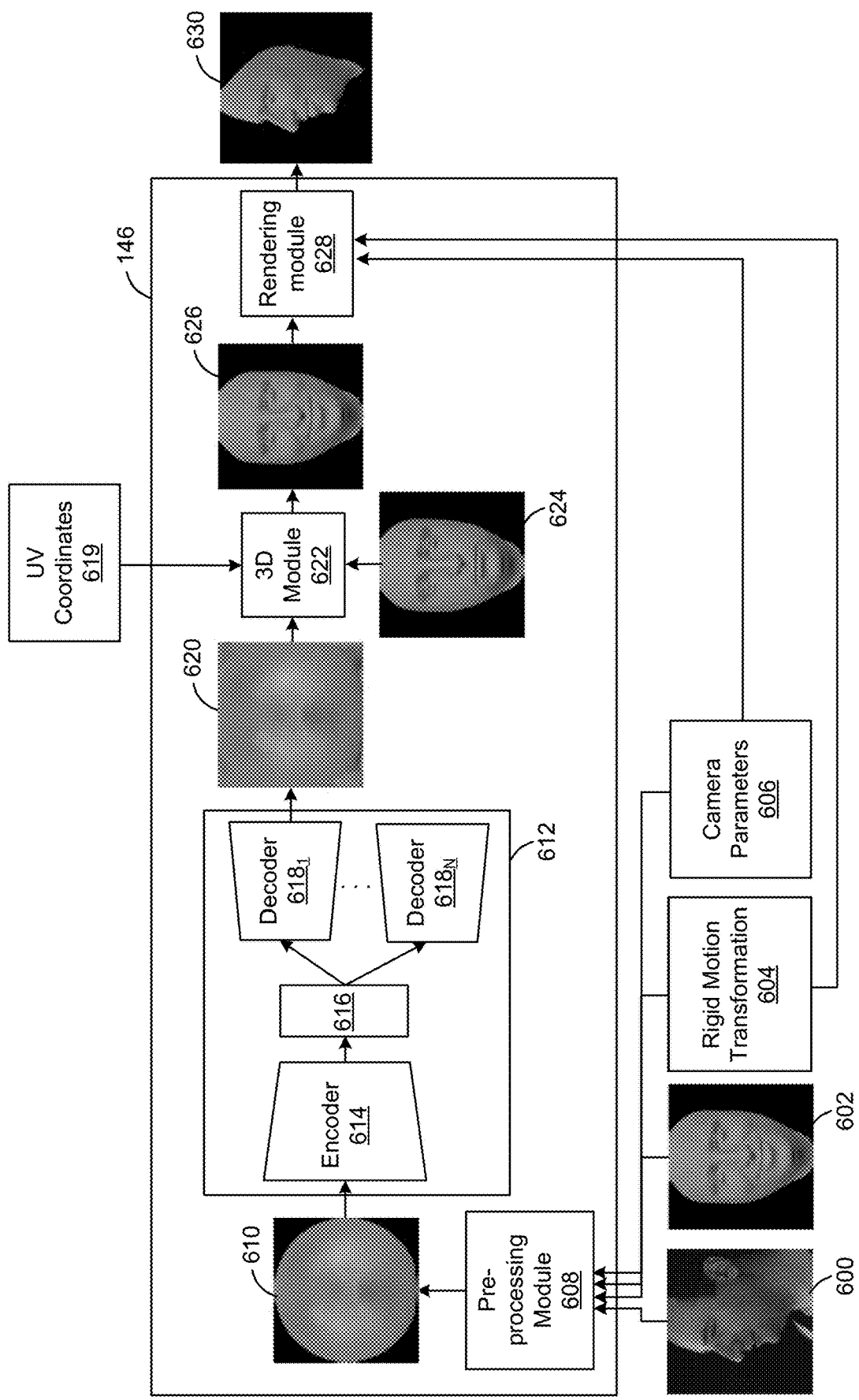
FIG. 6 is a more detailed illustration of the face changing application of FIG. 1, according to other various embodiments.

FIG. 6 is a more detailed illustration of the face changing application 146 of FIG. 1, according to other various embodiments. As shown, a pre-processing module 608 of the face changing application 146 receives an input image 600, 3D facial geometry (shown as 3D face mesh 602), a rigid motion transformation 604, and camera parameters 606 as inputs, and the pre-processing module 608 generates a displacement map 610. The input image 600 may be a video frame or a standalone image. The 3D face mesh 602 represents 3D geometry associated with the face in the input image 600. The rigid motion transformation 604 is a transformation that can be used to remove a pose of the face in the input image 600. For example, if the face is a profile view in the input image 600 (i.e., facing sideways), the rigid motion transformation 604 can be used to make the face frontal view. The camera parameters are parameter values associated with camera settings used to capture the input image 600, such as a camera focus length. The 3D face mesh 602, the rigid motion transformation 604, and the camera parameters 606 can be obtained in any technically feasible manner. For example, commercially available software such as Anyma®, which uses an anatomically-constrained local deformation model, can be used to generate the 3D face mesh 602, rigid motion transformation 604, and the camera parameters 606 from images of a face captured using a multi-view camera system. Other techniques can be used to generate the 3D face mesh 602, rigid motion transformation 604, and the camera parameters 606, without requiring a multi-view camera system.

In some embodiments, the pre-processing module 608 generates the displacement map 610 using the 3D facial geometry 602, the rigid motion transformation 604, the camera parameters 606, and a neutral facial geometry (not shown) corresponding to the 3D facial geometry 620. In such cases, the displacement map 610 generated by the pre-processing module 608 is a 2D position map representing differences between vertices of the 3D face mesh 602 and the neutral facial geometry of the same facial identity. As shown, the face changing application 146 inputs the displacement map 610 into a comb network 612, which includes an encoder 614 that generates a latent representation 616 and multiple decoders $618_{1-N}$ (individually referred to herein as "a decoder 618" and collectively referred to as "decoders 618"), each of which can be used to generate a swapped displacement map 620 for a corresponding facial identity. A 3D module 622 uses the swapped displacement map 620 and UV coordinates 619 associated with facial geometry to apply the swapped displacement map 620 to deform neutral facial geometry 624 for the same facial identity, producing a swapped facial geometry 626. The UV coordinates 619 indicate correspondences between 2D points in the swapped displacement map 620 and points in 3D space, which can be used to convert the swapped displacement map 620 to 3D displacements that are added to the neutral facial geometry 624 to generate the swapped facial geometry 626. As shown, a rendering module 628 can further render the swapped facial geometry 626 in screen space, using well-known rendering techniques, to generate a rendered image 630.

More formally, the displacement map 610 can be obtained by mapping every position map pixel (or texel in the case of a texture map) into 3D space using pre-computed barycentric coordinates. Instead of encoding the original position in world space, however, the face changing application 146 first removes the rigid motion and further subtracts the facial identity-specific neutral facial geometry. The result is the displacement map 610, which can be expressed as $\text{Dis}(u_i, v_i) = (x_i, y_i, z_i)$, where $(u_i, v_i)$ represent the UV coordinates of the i-th point in the facial surface and $(x_i, y_i, z_i)$ represents the 3D displacement from the corresponding point in the facial identity-specific neutral facial geometry.

In some embodiments, the comb network 612 is trained using a loss function that represents a reconstruction error between reconstructed facial geometry output by the 3D module 622 and the original 3D face mesh input into the pre-processing module 608. In such cases, rather than using a loss directly on the displacement map 620 output by a decoder 618 of the comb network 612 corresponding to the same facial identity, a loss is used on vertices of the reconstructed face model output by the 3D module 622. In particular, such vertices can be obtained by using the UV coordinates 619 to bilinearly sample vertex displacements from the displacement map 620, and the vertex displacements can then be added to the facial identity-specific neutral facial geometry. In some embodiments, the model trainer 116 can train the comb network 612 using a loss function having form $$\mathcal{L}_l = \lambda_{3D} \sum_{p=1}^{P} \frac{1}{|V_p|} \sum_{v_p \in V_p} \|v_p - \tilde{v}_p\|_1, \quad (4)$$

where $\|\cdot\|_1$ is the $l_1$-norm, $V_p$ is a set of meshes (vertices) corresponding to facial identity p, $\bar{d}_s = D_p(E(d_p)) \approx d_p$ is the autoencoder formulation with $d_p$ being the displacement map. Further, $\tilde{v}_p = T(\bar{d}_p, n_p)$ is the result of the transformation to 3D and adding the facial identity-specific neutral facial geometry $n_p$, and $\lambda_{3D}$ is a weighting term.

Experience has shown that adding new, untrained network components and fading the components in with a gain parameter $\alpha \in [0,1]$ does not work without a bounded activation function at the output of a decoder 618 of the comb network 612. In some embodiments, the model trainer 116 may assume that the displacement map 610 is bounded. In such cases, the bound can be estimated using the displacements observed in extracting the displacement map during preprocessing. In particular, using the displacements from the neutral facial geometry, a mean $\mu \in \mathbb{R}^3$ and a symmetrical maximum deviation $\delta_{max} \in \mathbb{R}^3$ from the mean it can be obtained. The sigmoid output of the decoder, denoted as $x \in [0,1]^3$, can be transformed with $$z_i = 2\delta_{max,i}\left(x_i - \frac{1}{2}\right) + \mu_i, \quad i = 1, 2, 3 \quad (5)$$

to obtain the displacement map $z \in [\mu - \delta_{max}, \mu + \delta_{max}]$. In addition, $\mu$ and $\delta_{max}$ can be chosen with the appropriate tolerance to capture all observed expressions and expression(s) that are expected to be swapped to.

Once trained, the comb network 612 can be used to obtain the appearance of the s-th decoder corresponding to a source, in order to obtain vertices $\tilde{v}_s = T(D_s(E(d_p)), n_s)$ with the behavior of a target, and without any rigid motion. Then, using the rigid motion transformation and camera parameters of the target frame, the face changing application 146 can render the swapped geometry. More generally, any rigid motion or camera parameters may be used to render the swapped geometry, as invisible parts of the face are also generated by the comb network 612.

Figure 7:
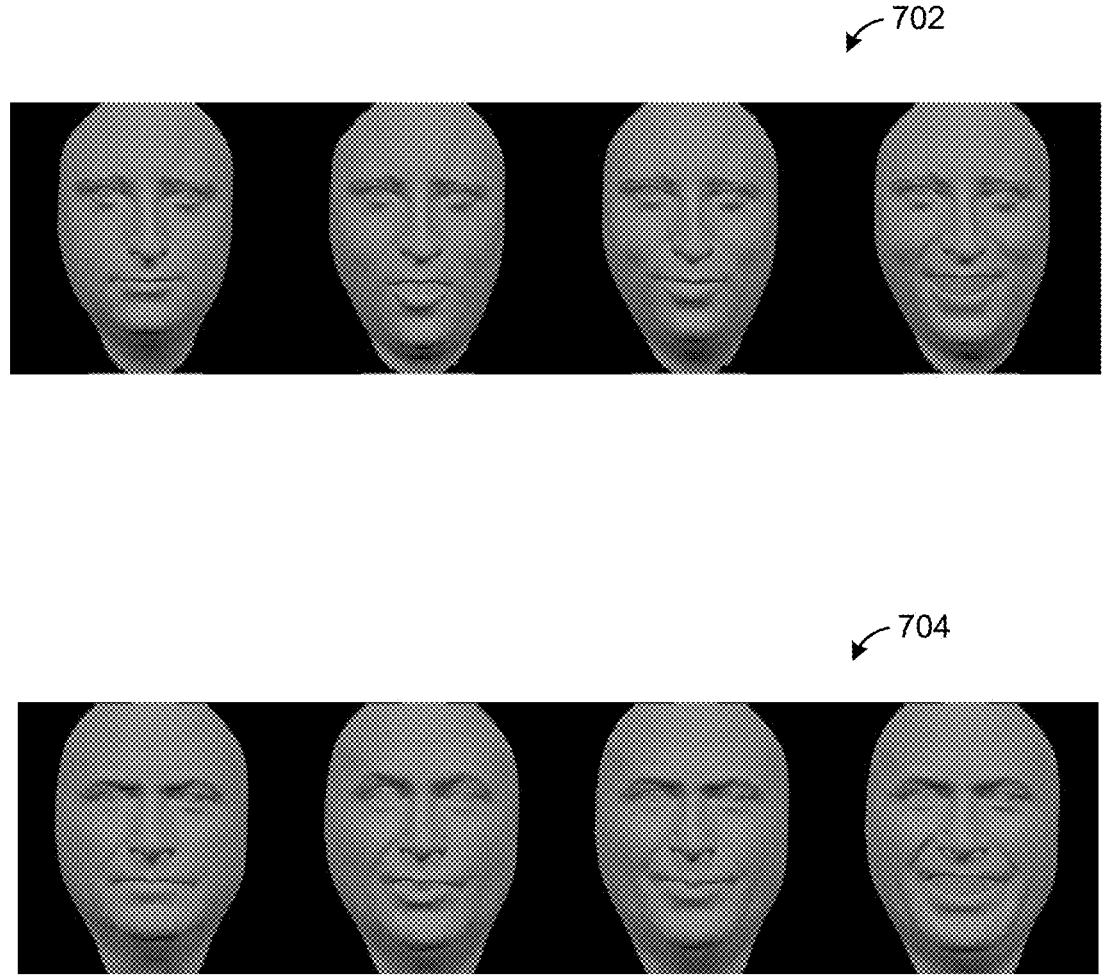
FIG. 7 illustrates an exemplar face swap in which 3D facial geometry is changed, according to various embodiments.

FIG. 7 illustrates an exemplar face swap in which 3D facial geometry is changed, according to various embodiments. As described, 3D facial meshes for a facial identity serve as an appearance source and can be used to train a corresponding decoder 618 in the comb network 612. Thereafter, a displacement map generated during pre-processing based on 3D facial geometry associated with an image, a corresponding neutral facial geometry, a rigid motion transformation, and camera parameters, can be input into the comb network 612. Using the decoder 618 corresponding to the facial identity of the appearance source, the face changing application 146 can generate displacement maps that swap the 3D geometry of a behavior target 702 with the source facial identity to generate swapped 3D geometry, which can then be rendered as images 704.

Figure 8:
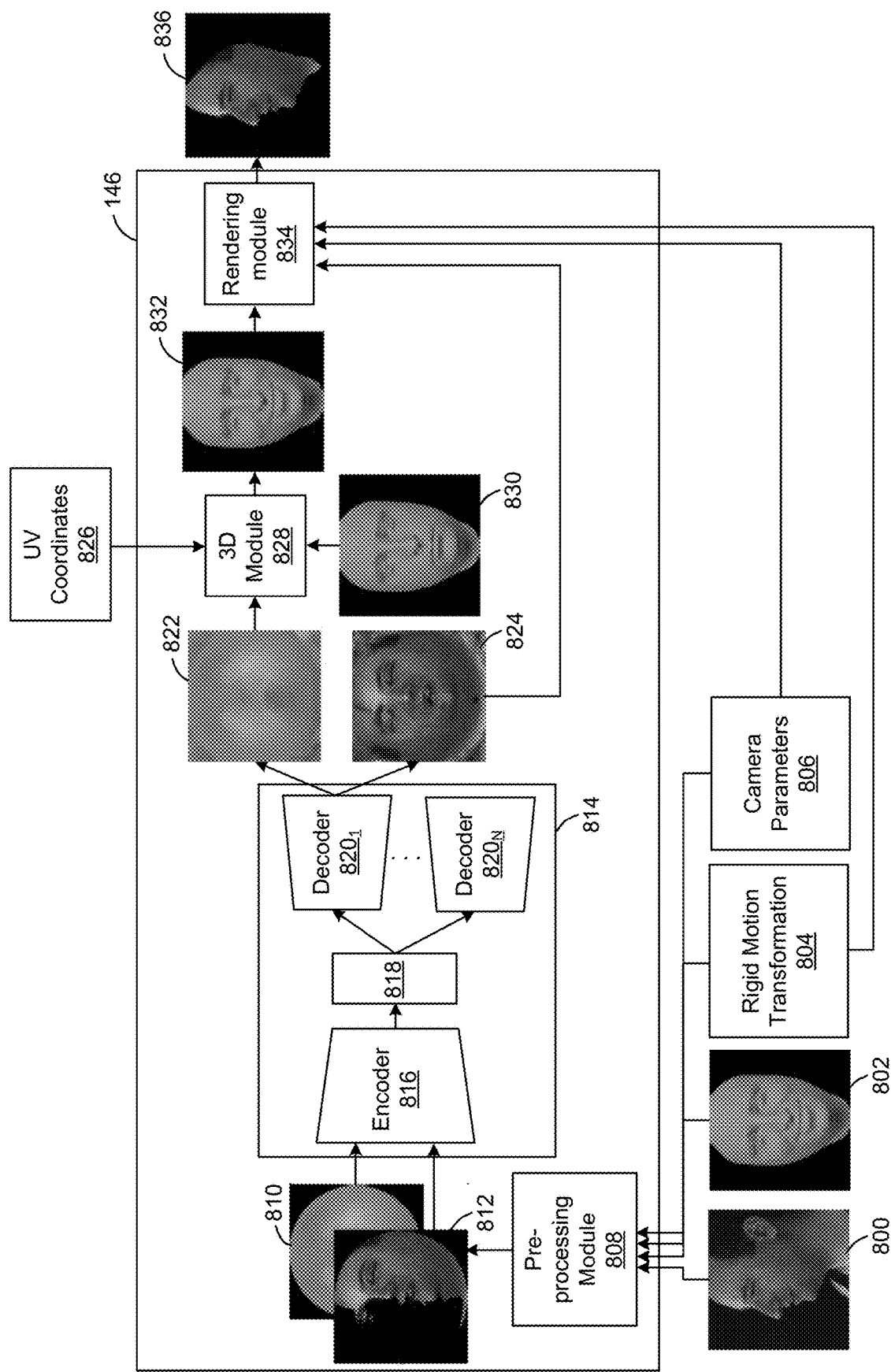
FIG. 8 is a more detailed illustration of the face changing application of FIG. 1, according to other various embodiments.

FIG. 8 is a more detailed illustration of the face changing application 146 of FIG. 1, according to other various embodiments. As shown, a pre-processing module 808 of the face changing application 146 receives as input an image 800, 3D facial geometry (shown as 3D face mesh 802), a rigid motion transformation 804, and camera parameters 606, and the pre-processing module 808 generates a texture map 812 and a displacement map 810. The input image 800 may be a video frame or a standalone image. The displacement map 810 is similar to the displacement map 610, described above in conjunction with FIG. 6, and can be obtained in a similar manner. The texture map 812 is similar to the texture maps 204 and 404 described above in conjunction with FIGS. 2 and 4, respectively, and can be obtained via, e.g., texture unwrapping. In some embodiments, the texture map 812 is provided as normalized input into the comb network 814. Further, in some embodiments, a face mask can be obtained by projecting the high-quality 3D face data in screen space. It should be understood that adding a view-dependent texture adds viewpoint information to the input, and the output is a viewpoint-dependent texture. In some embodiments, the pre-processing module 808 may also concatenate the texture map 812 and the displacement map 810 for input into the comb network 814.

Illustratively, the comb network 814 takes the texture map 812 and the displacement map 810 as inputs to an encoder 816 that generates a latent representation 818 and outputs, via one of a number of decoders $820_{1-N}$ (individually referred to herein as "a decoder 820" and collectively referred to as "decoders 820") that decodes the latent representation 818, a swapped texture map 824 and a swapped displacement map 822. The swapped texture map 824 is similar to the swapped texture map 212 described above in conjunction with FIG. 2. The swapped displacement map 822 is similar to the swapped displacement map 620 described above in conjunction with FIG. 6. In some embodiments, neural rendering, similar to that described above in conjunction with FIG. 4, may also be used, in which case the decoders 820 of the comb network 814 may output images representing a neural texture and a neural exterior face region, rather than the swapped texture map 824. In such cases, a neural renderer may also be trained to convert an intermediate image, generated based on the neural texture and the neural exterior face region, into a final rendered image, similar to the discussion above in conjunction with FIG. 4.

Returning to FIG. 8, a 3D module 828 applies the swapped displacement map 822 to deform the neutral facial geometry 830 associated with the same facial identity based on UV coordinates 826, in order to generate swapped facial geometry 832. Similar to the UV coordinates 619 described above in conjunction with FIG. 6, the UV coordinates 826 indicate correspondences between 2D points in the swapped displacement map 822 and points in 3D space, which can be used to convert the swapped displacement map 822 to 3D displacements that are added to the neutral facial geometry 830, generating the swapped facial geometry 832. Then, a rendering module 834 renders an image 836 by combining the swapped texture 824 and the swapped facial geometry 832, and by applying the rigid motion transformation 804 and camera parameters 806.

In some embodiments, texture and displacement maps are learned within the same comb network 814 and the same latent space. In such cases, RGB (red, green, blue) and XYZ that belong together can be localized at the same places in UV space, allowing information from each other be leveraged, unlike a fully connected network that would not allow such a spatial coupling. In some embodiments, a reconstruction loss on the texture map output by the comb network 814, as well as a loss on vertices of the 3D geometry output by the 3D model 828, are applied. In such cases, the loss function of level l that is used during training can have form $$\mathcal{L}_t = \sum_{p=1}^{P} \frac{1}{|Z_p|} \sum_{(y_p, \tilde{y}_p) \in Z_p} \lambda_{tex} f_t(y_p \odot m_{y_p}, \tilde{y}_p \odot m_{y_p}) + \quad (6)$$

$$\lambda_{3D} \| v_p - \tilde{v}_p \|_1,$$

where $Z_p := \{(y_i, v_i)\}_{i=1, \ldots, n_p}$, $y_i \in Y_p$, $v_i \in V_p$ is the set of corresponding pairs of texture $y_p$ and meshes (vertices) $v_p$ of facial identity p and $n_p$ is the number of frames of facial identity p, $m_{y_p}$ is the texture mask, and the texture loss and vertex loss are weighted with $\lambda_{tex}$ and $\lambda_{3D}$, respectively.

Figure 9:
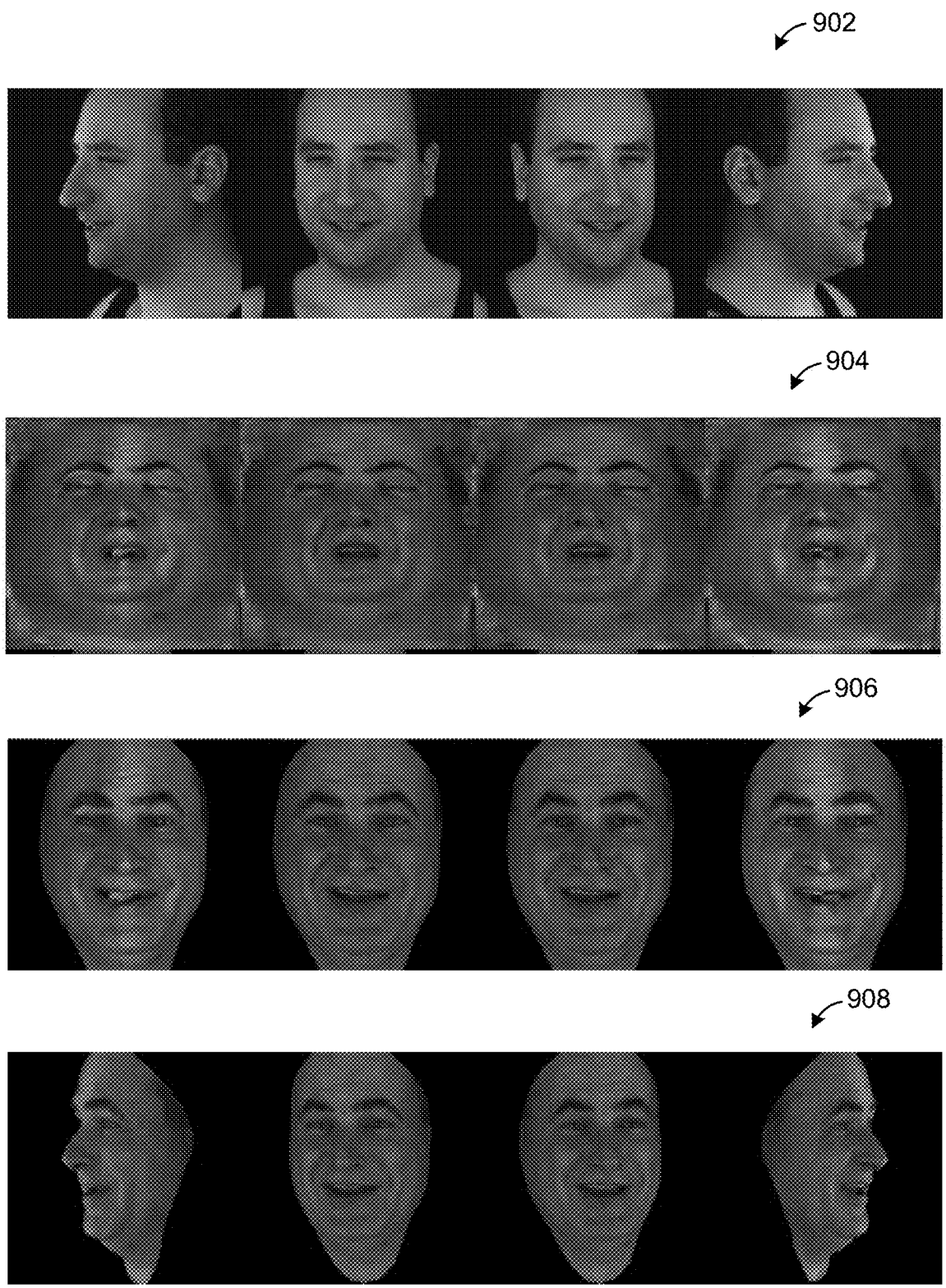
FIG. 9 illustrates an exemplar face swap in which 2D texture and 3D facial geometry are changed, according to various embodiments.

FIG. 9 illustrates an exemplar face swap in which 2D texture and 3D facial geometry are changed, according to various embodiments. Input frames 902 that include one facial identity, as well as a corresponding 3D face geometry, rigid motion transformation, and camera parameters (not shown), are used to generate swapped textures 904 and swapped (frontal) facial geometries 906 associated with a different facial identity. As described, in some embodiments, the input frames 902, 3D face geometry, rigid motion transformation, and camera parameters can be pre-processed to generate a texture map and a displacement map that are input into the comb network 814, and one of the decoders 820 of the comb network 814 then outputs the generate swapped textures 904 and swapped displacement maps that can be combined with a neutral facial geometry based on UV coordinates to generate swapped facial geometries 906. In addition, rigid motion transformations and camera parameters can be used, along with the swapped facial geometries and swapped textures to render images 908 in which the swapped faces have poses associated with the rigid motion transformations and camera parameters.

Figure 10:
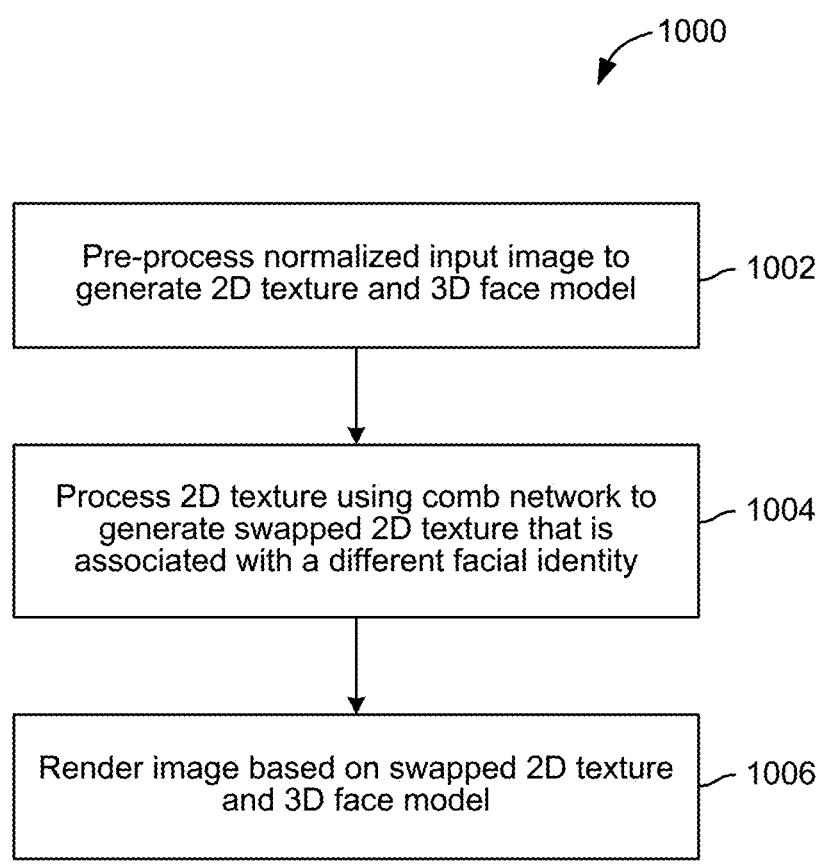
FIG. 10 sets forth a flow diagram of method steps for changing the texture of a face within a video frame or image, according to various embodiments.

FIG. 10 sets forth a flow diagram of method steps for changing the texture of a face in a video frame or image, according to other various embodiments. Although the method steps are described in conjunction with the systems of FIGS. 1-2, persons of ordinary skill in the art will understand that any system configured to perform the method steps, in any order, is within the scope of the present disclosure.

As shown, a method 1000 begins at step 1002, where the face changing application 146 pre-processes a normalized input image to generate a 2D texture and a 3D face model. The input image can be a frame of a video or a standalone image. In some embodiments, the 3D face model 216 may be obtained by using a convolutional neural network and hand-crafted features to fit a 3D face model to the input image, and the 2D texture may be obtained by unwrapping a texture map from the input image using the 3D face model.

At step 1004, the face changing application 146 processes the 2D texture using a comb network, or any other technically feasible ML model, to generate a swapped 2D texture that is associated with a facial identity. As described above in conjunction with FIG. 2, a comb network (or other ML model) can be trained to generate such a swapped 2D texture for different identities.

At step 1006, the face changing application 146 renders an image based on the swapped 2D texture and the 3D face model. In some embodiments, well-known rendering techniques can be used to combine the swapped 2D texture and the 3D face model to generate a rendered image.

Figure 11:
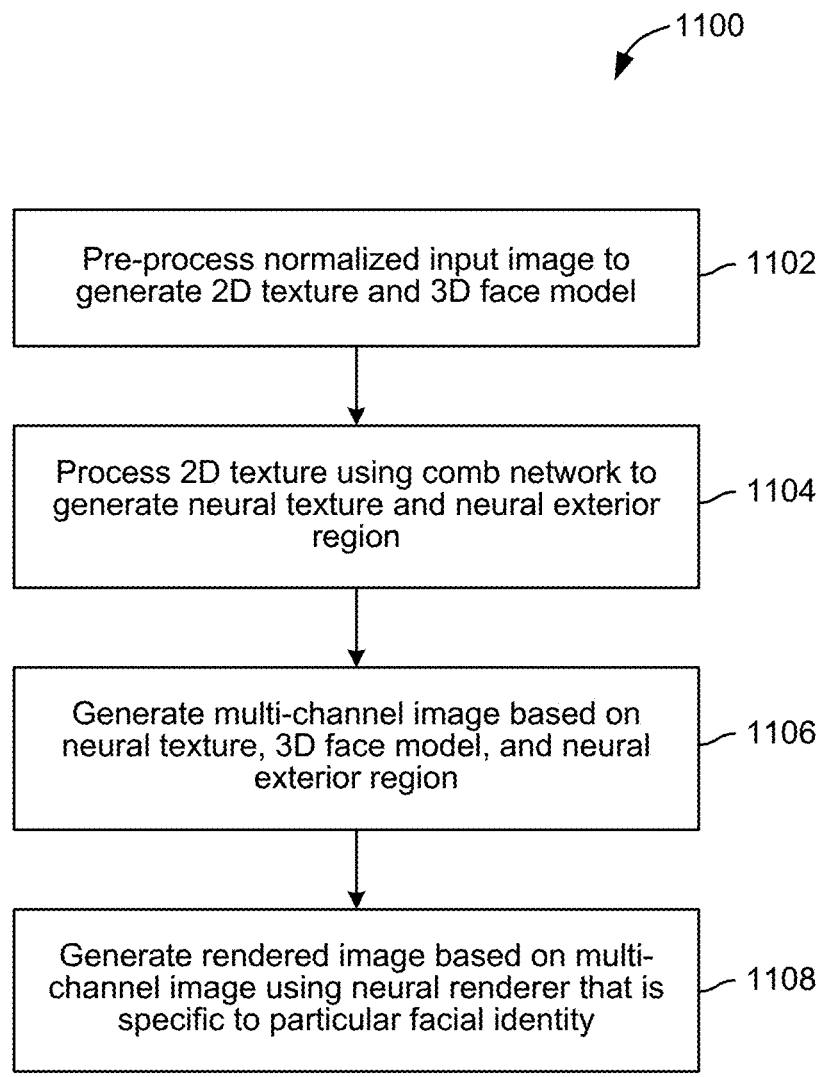
FIG. 11 sets forth a flow diagram of method steps for changing the texture of a face within a video frame or image using neural rendering, according to various embodiments.

FIG. 11 sets forth a flow diagram of method steps for changing the texture of a face in a video frame or image using neural rendering, according to various embodiments. Although the method steps are described in conjunction with the systems of FIGS. 1 and 4, persons of ordinary skill in the art will understand that any system configured to perform the method steps, in any order, is within the scope of the present disclosure.

As shown, a method 1100 begins at step 1102, where the face changing application 146 pre-processes a normalized input image to generate a 2D texture and a 3D face model. The input image can be a frame of a video or a standalone image. Similar to step 1102, described above in conjunction with FIG. 10, the 3D face model 216 may be obtained by, e.g., using a convolutional neural network and hand-crafted features to fit a 3D face model to the input image, and the 2D texture may be obtained by, e.g., unwrapping a texture map from the input image using the 3D face model.

At step 1104, the face changing application 146 processes the 2D texture using a comb network, or any other technically feasible ML model, to generate images representing a neural texture and a neural exterior region. As described above in conjunction with FIG. 4, a comb network (or other ML model) can be trained to generate such images representing the neural texture and the neural external region for different identities.

At step 1106, the face changing application 146 generates a multi-channel rendered image based on the neural texture, the 3D face model, and the neural exterior region. In some embodiments, differential rendering is performed to combine the neural texture with the 3D face model into an image that is composited with image(s) representing the neural exterior region to generate the multi-channel rendered image, as described above in conjunction with FIG. 4.

At step 1108, the face changing application 146 generates a rendered image based on the multi-channel image using a neural renderer that is specific to a particular facial identity. In some embodiments, the neural renderer can be trained, along with a comb network, to take as input the multi-channel rendered image generated from output of the comb network and a 3D face model, and to output an RGB image, as described above in conjunction with FIG. 4.

Figure 12:
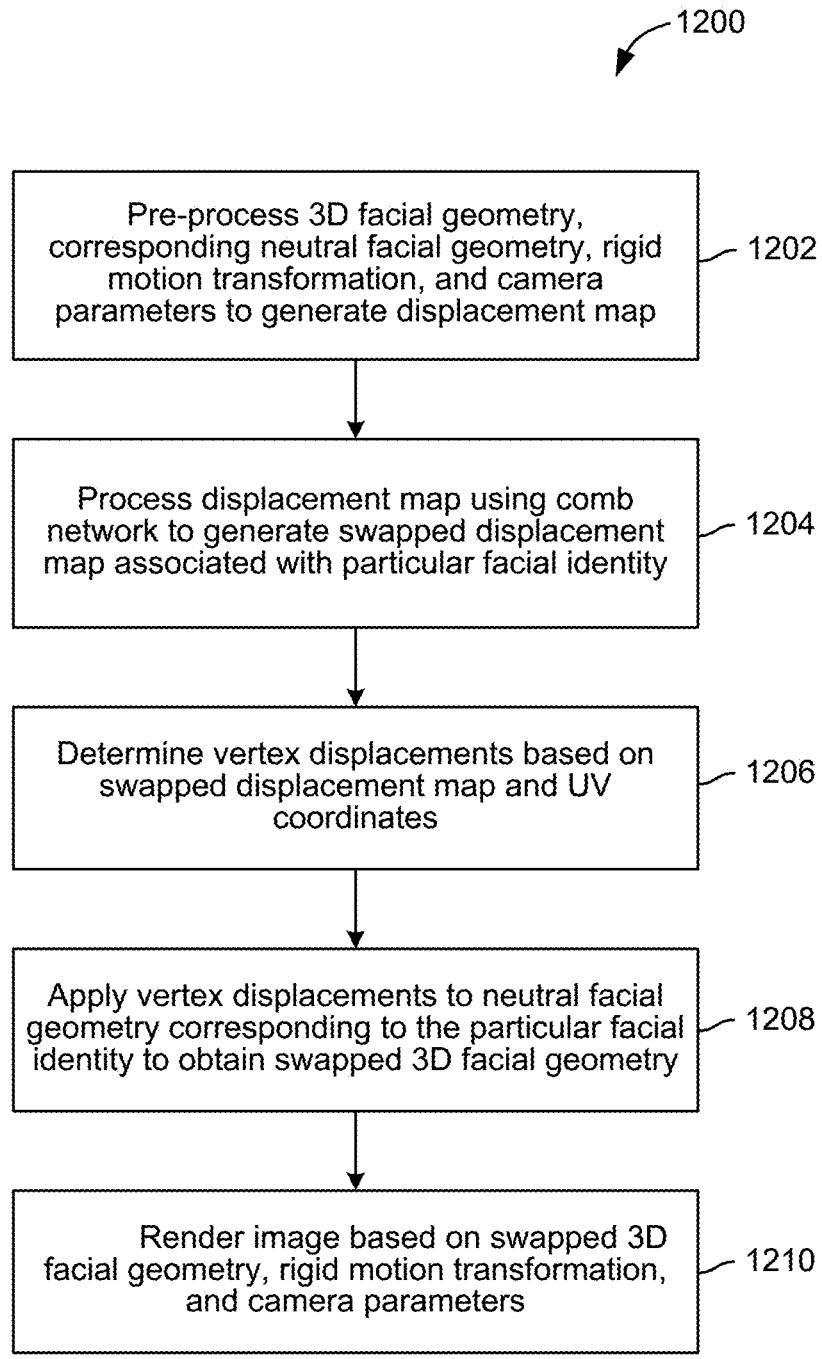
FIG. 12 sets forth a flow diagram of method steps for changing the geometry of a face within a video frame or image, according to various embodiments.

FIG. 12 sets forth a flow diagram of method steps for changing the geometry of a face in a video frame or image, according to other various embodiments. Although the method steps are described in conjunction with the systems of FIGS. 1 and 6, persons of ordinary skill in the art will understand that any system configured to perform the method steps, in any order, is within the scope of the present disclosure.

As shown, a method 1200 begins at step 1202, where the face changing application 146 pre-processes 3D facial geometry associated with a video frame or image, corresponding neutral face geometry, a rigid motion transformation, and camera parameters to generate a displacement map. As described, the 3D facial geometry, rigid motion transformation, and camera parameters can be obtained in any technically feasible manner, such as using Anyma®. Thereafter, the face changing application 146 can generate the displacement map by mapping every position map pixel (or texel in the case of a texture map) into 3D space using pre-computed barycentric coordinates.

At step 1204, the face changing application 146 processes the displacement map using a comb network to generate a swapped displacement map that is associated with a particular facial identity. As described above in conjunction with FIG. 6, a comb network can be trained to generate such a swapped displacement for different facial identities.

At step 1206, the face changing application 146 determines vertex displacements based on the swapped displacement map and UV coordinates. The UV coordinates can be used to convert 2D displacements represented by the swapped displacement map to 3D displacements, as described above in conjunction with FIG. 6.

At step 1208, the face changing application 146 applies the vertex displacements to neutral facial geometry corresponding to the particular facial identity to obtain swapped 3D facial geometry. The vertex displacements can be used to deform the neutral facial geometry to generate the swapped 3D facial geometry, as described above in conjunction with FIG. 6.

At step 1210, the face changing application 146 renders an image based on swapped 3D facial geometry, the rigid motion transformation, and the camera parameters. Well-known rendering techniques may be used in some embodiments. Although described with respect to using the same rigid motion transformation and camera parameters, changes can also be made to rendering parameters, such as to pose, lighting, and/or camera parameters.

Figure 13:
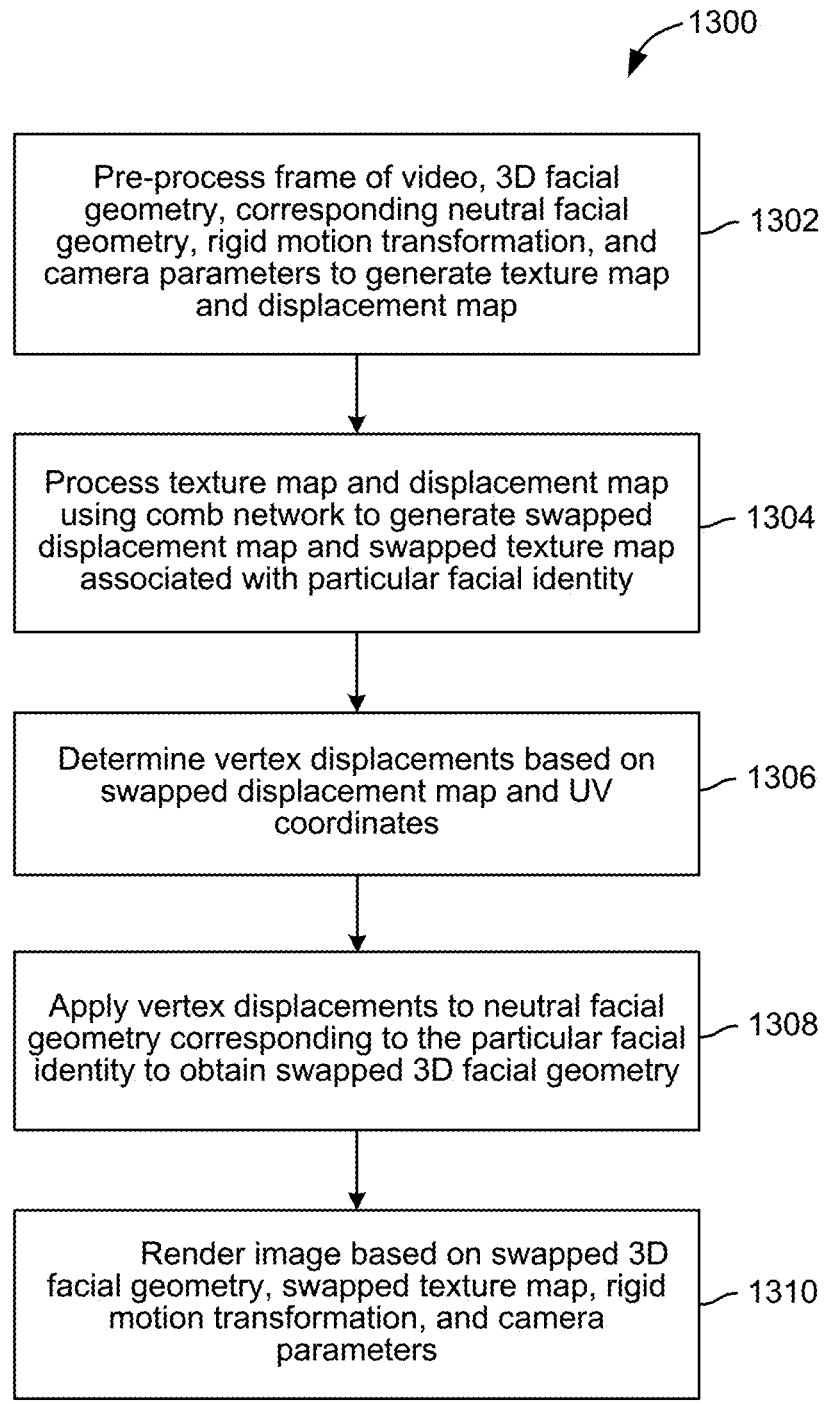
FIG. 13 sets forth a flow diagram of method steps for changing the texture and geometry of a face in a video frame or image, according to various embodiments.

FIG. 13 sets forth a flow diagram of method steps for changing the texture and geometry of a face in a video frame or image, according to various embodiments. Although the method steps are described in conjunction with the systems of FIGS. 1 and 8, persons of ordinary skill in the art will understand that any system configured to perform the method steps, in any order, is within the scope of the present disclosure.

As shown, a method 1300 begins at step 1302, where the face changing application 146 pre-processes a frame of video, associated 3D facial geometry, corresponding neutral facial geometry, a rigid motion transformation, and camera parameters to a generate texture map and a displacement map. Similar to step 1202, described above in conjunction with FIG. 12, the 3D face model, rigid motion transformation, and camera parameters can be obtained in any technically feasible manner, such as using Anyma®. Further, the face changing application 146 can generate the texture map via texture unwrapping and the displacement map by mapping every position map pixel (or texel in the case of a texture map) into 3D space using pre-computed barycentric coordinates.

At step 1304, the face changing application 146 processes the texture map and displacement map using a comb network to generate a swapped displacement map and a swapped texture map associated with a particular facial identity. As described above in conjunction with FIG. 8, a comb network can be trained to generate such a swapped displacement and a swapped texture map for different facial identities.

At step 1306, the face changing application 146 determines vertex displacements based on the swapped displacement map and UV coordinates. Similar to step 1206, described above in conjunction with FIG. 12, The UV coordinates can be used to convert 2D displacements represented by the swapped displacement map to 3D displacements.

At step 1308, the face changing application 146 applies the vertex displacements of the swapped displacement map to neutral facial geometry corresponding to the particular facial identity to obtain swapped 3D facial geometry. The vertex displacements can be used to deform the neutral facial geometry to generate the swapped 3D facial geometry, as described above in conjunction with FIG. 8.

At step 1310, the face changing application 146 renders an image based on the swapped 3D facial geometry, the swapped texture map, the rigid motion transformation, and the camera parameters. Well-known rendering techniques may be used in some embodiments. In alternative embodiments, neural rendering may be employed, as described above in conjunction with FIG. 8. Although described with respect to using the same rigid motion transformation and camera parameters, changes can also be made to rendering parameters, such as to pose, lighting, and/or camera parameters.

Although described herein primarily with respect to human faces, some embodiments may also be used to change the identities of other types of faces, such as computer-generated faces, animal faces, or even objects other than faces, that appear in the frames of a video or standalone images. Generally, embodiments may be used for domain transfers in image space for topologically equivalent objects having corresponding vertices, with faces being an example domain.

In sum, techniques are disclosed for changing the identities of faces in video frames and images. In some embodiments, 3D geometry of a face is used to inform the facial identity change produced by an image-to-image translation model, such as a comb network model. In some embodiments, the model can take a 2D texture associated with one facial identity as input and output another 2D texture associated with another facial identity, which can then be used along with 3D facial geometry to render an image in which the other 2D texture is applied to the 3D facial geometry. In addition, a neural renderer can be used to improve the face swapping results by generating rendered images that are similar to the images of faces in a training data set. In other embodiments, the model can take as input a displacement map, which is generated based on 3D facial geometry associated with a video frame or image, a corresponding neutral facial geometry, a rigid motion transformation, and camera parameters, and the model outputs another displacement map associated with a different facial identity. The other displacement map can then be applied to deform a neutral facial geometry corresponding to the different facial identity and used, along with the rigid motion transformation and the camera parameters (or a different rigid motion transformation and camera parameters), to render an image that includes facial geometry associated with the different facial identity. In further embodiments, the model can take as inputs a texture map and a displacement map, which are generated based on an input frame, associated 3D facial geometry, a corresponding neutral facial geometry, a rigid motion transformation, and camera parameters. In such cases, the model outputs another texture map and another displacement map associated with a different facial identity, which can then be used along with another neutral facial geometry, the rigid motion transformation, and the camera parameters (or a different rigid motion transformation and camera parameters), to render an image that includes facial geometry and texture associated with the different facial identity.

At least one technical advantage of the disclosed techniques relative to the prior art is that the disclosed techniques can be effectively utilized to change (i.e., replace or modify) facial identities in video frames and images where the faces being modified to implement the requisite facial identity changes are shown with relatively extreme poses. The disclosed techniques also enable realistic-looking facial changes to be made in video frames and images, while reducing or eliminating the unwanted artifacts typically produced by 3D morphable models. In addition, the disclosed technique can produce more coherent and temporally-stable sequences of video frames than conventional techniques for changing facial identities. These technical advantages represent one or more technological improvements over prior art approaches.

1. In some embodiments, a computer-implemented method for changing an object within a video frame or image comprises generating at least one of a first texture map or a first displacement map associated with a first image that includes a first object, generating, via a machine learning model, at least one of a second texture map or a second displacement map based on the at least one of the first texture map or the first displacement map, and rendering a second image based on the at least one of the second texture map or the second displacement map and three-dimensional (3D) geometry associated with the first object or a second object.

2. The computer-implemented method of clause 1, wherein the second texture map comprises a neural texture map, and the method further comprises rendering, via a neural renderer, a third image based on the second image.

3. The computer-implemented method of clauses 1 or 2, wherein generating the first texture map comprises performing one or more pre-processing operations based on only the first image.

4. The computer-implemented method of any of clauses 1-3, wherein generating the at least one of the first texture map or the first displacement map comprises performing one or more pre-processing operations based on the first image, 3D geometry associated with the first object, neutral 3D geometry associated with the first object, a rigid motion transformation, and one or more camera parameter values.

5. The computer-implemented method of any of clauses 1-4, wherein the second image is further rendered based on a rigid motion transformation and one or more camera parameter values.

6. The computer-implemented method of any of clauses 1-5, further comprising generating the 3D geometry associated with the second object based on the second displacement map and a neutral 3D geometry associated with the second object.

7. The computer-implemented method of any of clauses 1-6, wherein the machine learning model comprises an image-to-image translation model.

8. The computer-implemented method of any of clauses 1-7, wherein the machine learning model comprises an encoder and a plurality of decoders associated with different facial identities.

9. The computer-implemented method of any of clauses 1-8, wherein the first object and the second object are associated with different facial identities.

10. In some embodiments, one or more non-transitory computer-readable storage media include instructions that, when executed by at least one processor, cause the at least one processor to perform steps for changing an object within a video frame or image, the steps comprising generating at least one of a first texture map or a first displacement map associated with a first image that includes a first object, generating, via a machine learning model, at least one of a second texture map or a second displacement map based on the at least one of the first texture map or the first displacement map, and rendering a second image based on the at least one of the second texture map or the second displacement map and three-dimensional (3D) geometry associated with the first object or a second object.

11. The one or more non-transitory computer-readable storage media of clause 10, wherein the second texture map comprises a neural texture map, and the steps further comprise rendering, via a neural renderer, a third image based on the second image.

12. The one or more non-transitory computer-readable storage media of clauses 10 or 11, wherein the machine learning model further generates a fourth image of a neural exterior face region, and rendering the third image comprises compositing the second image with the fourth image to generate a composited image, and rendering the third image based on the composited image.

13. The one or more non-transitory computer-readable storage media of any of clauses 10-12, wherein the neural renderer is associated with the second object.

14. The one or more non-transitory computer-readable storage media of any of clauses 10-13, wherein generating the at least one of the first texture map or the first displacement map comprises performing one or more pre-processing operations based on the first image, 3D geometry associated with the first object, neutral 3D geometry associated with the first object, a rigid motion transformation, and one or more camera parameter values.

15. The one or more non-transitory computer-readable storage media of any of clauses 10-14, the steps further comprising generating the 3D geometry associated with the second object based on the second displacement map and a neutral 3D geometry associated with the second object.

16. The one or more non-transitory computer-readable storage media of any of clauses 10-15, wherein the machine learning model comprises an image-to-image translation model.

17. The one or more non-transitory computer-readable storage media of any of clauses 10-16, wherein the machine learning model comprises a comb network.

18. The one or more non-transitory computer-readable storage media of any of clauses 10-17, wherein the first object and the second object are associated with different facial identities.

19. In some embodiments, a system comprises one or more memories storing instructions, and one or more processors that are coupled to the one or more memories and, when executing the instructions, are configured to generate at least one of a first texture map or a first displacement map associated with a first image that includes a first object, generate, via a machine learning model, at least one of a second texture map or a second displacement map based on the at least one of the first texture map or the first displacement map, and render a second image based on the at least one of the second texture map or the second displacement map and three-dimensional (3D) geometry associated with the first object or a second object.

20. The system of clause 19, wherein the second texture map comprises a neural texture map, and the one or more processors, when executing the instructions, are further configured to render, via a neural renderer, a third image based on the second image.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for changing an object within a video frame or image, the method comprising:
    generating at least one of a first texture map or a first displacement map associated with a first image that includes a first object;
    generating, via a machine learning model, at least one of a second texture map or a second displacement map based on the at least one of the first texture map or the first displacement map; and
    rendering a second image based on the at least one of the second texture map or the second displacement map and three-dimensional (3D) geometry associated with the first object or a second object.

2. The computer-implemented method of claim 1, wherein the second texture map comprises a neural texture map, and the method further comprises rendering, via a neural renderer, a third image based on the second image.

3. The computer-implemented method of claim 1, wherein generating the first texture map comprises performing one or more pre-processing operations based on only the first image.

4. The computer-implemented method of claim 1, wherein generating the at least one of the first texture map or the first displacement map comprises performing one or more pre-processing operations based on the first image, 3D geometry associated with the first object, neutral 3D geometry associated with the first object, a rigid motion transformation, and one or more camera parameter values.

5. The computer-implemented method of claim 1, wherein the second image is further rendered based on a rigid motion transformation and one or more camera parameter values.

6. The computer-implemented method of claim 1, further comprising generating the 3D geometry associated with the second object based on the second displacement map and a neutral 3D geometry associated with the second object.

7. The computer-implemented method of claim 1, wherein the machine learning model comprises an image-to-image translation model.

8. The computer-implemented method of claim 1, wherein the machine learning model comprises an encoder and a plurality of decoders associated with different facial identities.

9. The computer-implemented method of claim 1, wherein the first object and the second object are associated with different facial identities.

10. One or more non-transitory computer-readable storage media including instructions that, when executed by at least one processor, cause the at least one processor to perform steps for changing an object within a video frame or image, the steps comprising:
    generating at least one of a first texture map or a first displacement map associated with a first image that includes a first object;
    generating, via a machine learning model, at least one of a second texture map or a second displacement map based on the at least one of the first texture map or the first displacement map; and rendering a second image based on the at least one of the second texture map or the second displacement map and three-dimensional (3D) geometry associated with the first object or a second object.

11. The one or more non-transitory computer-readable storage media of claim 10, wherein the second texture map comprises a neural texture map, and the steps further comprise rendering, via a neural renderer, a third image based on the second image.

12. The one or more non-transitory computer-readable storage media of claim 11, wherein the machine learning model further generates a fourth image of a neural exterior face region, and rendering the third image comprises:

compositing the second image with the fourth image to generate a composited image; and rendering the third image based on the composited image.

13. The one or more non-transitory computer-readable storage media of claim 11, wherein the neural renderer is associated with the second object.

14. The one or more non-transitory computer-readable storage media of claim 10, wherein generating the at least one of the first texture map or the first displacement map comprises performing one or more pre-processing operations based on the first image, 3D geometry associated with the first object, neutral 3D geometry associated with the first object, a rigid motion transformation, and one or more camera parameter values.

15. The one or more non-transitory computer-readable storage media of claim 10, the steps further comprising generating the 3D geometry associated with the second object based on the second displacement map and a neutral 3D geometry associated with the second object.

16. The one or more non-transitory computer-readable storage media of claim 10, wherein the machine learning model comprises an image-to-image translation model.

17. The one or more non-transitory computer-readable storage media of claim 10, wherein the machine learning model comprises a comb network.

18. The one or more non-transitory computer-readable storage media of claim 10, wherein the first object and the second object are associated with different facial identities.

19. A system, comprising:

one or more memories storing instructions; and one or more processors that are coupled to the one or more memories and, when executing the instructions, are configured to:

generate at least one of a first texture map or a first displacement map associated with a first image that includes a first object, generate, via a machine learning model, at least one of a second texture map or a second displacement map based on the at least one of the first texture map or the first displacement map, and render a second image based on the at least one of the second texture map or the second displacement map and three-dimensional (3D) geometry associated with the first object or a second object.

20. The system of claim 19, wherein the second texture map comprises a neural texture map, and the one or more processors, when executing the instructions, are further configured to render, via a neural renderer, a third image based on the second image.

* * * * *

UNITED STATES PATENT AND TRADEMARK OFFICE
CERTIFICATE OF CORRECTION

| | |
|---|---|
| PATENT NO. | : 11,222,466 B1 |
| APPLICATION NO. | : 17/039895 |
| DATED | : January 11, 2022 |
| INVENTOR(S) | : Jacek Krzysztof Naruniec et al. |

It is certified that error appears in the above-identified patent and that said Letters Patent is hereby corrected as shown below:

On the Title Page

(56) References Cited:

Column 2, Line 2, Please delete "GN 111028318 A 4/2020" and insert --CN 111028318 A 4/2020--;

Page 2, Column 1, Line 1, Please delete "GN 111080511 A 4/2020" and insert --CN 111080511 A 4/2020--;

Page 3, Column 1, Line 11, Please delete "Oaysan et al., "A 3D Face Model for Pose and Illumination Invariant Face Recognition", In 2009 Sixth IEEE International Conference on Advanced Video and Signal Based Surveillance, 2009, pp. 296-301." and insert --Paysan et al., "A 3D Face Model for Pose and Illumination Invariant Face Recognition", In 2009 Sixth IEEE International Conference on Advanced Video and Signal Based Surveillance, 2009, pp. 296-301.--.

Signed and Sealed this
Thirteenth Day of June, 2023

Katherine Kelly Vidal
*Director of the United States Patent and Trademark Office*